(12) United States Patent
Talbot

(10) Patent No.: US 10,575,463 B2
(45) Date of Patent: Mar. 3, 2020

(54) STUB GUARD FOR A SICKLE CUTTER SYSTEM

(71) Applicant: Macdon Industries Ltd., Winnipeg (CA)

(72) Inventor: Francois R. Talbot, Winnipeg (CA)

(73) Assignee: Macdon Industries Ltd., Winnipeg, MB (CA)

( * ) Notice: Subject to any disclaimer, the term of this patent is extended or adjusted under 35 U.S.C. 154(b) by 0 days.

(21) Appl. No.: 15/681,538

(22) Filed: Aug. 21, 2017

(65) Prior Publication Data

US 2019/0053426 A1 Feb. 21, 2019

(51) Int. Cl.
*A01D 34/13* (2006.01)
*A01D 34/18* (2006.01)
*A01D 34/14* (2006.01)
*A01D 34/17* (2006.01)
*A01D 34/20* (2006.01)

(52) U.S. Cl.
CPC ............. *A01D 34/18* (2013.01); *A01D 34/14* (2013.01); *A01D 34/17* (2013.01); *A01D 34/20* (2013.01)

(58) Field of Classification Search
CPC ........ A01D 34/18; A01D 34/14; A01D 34/17; A01D 34/20
USPC ............................................ 56/298, 307–310
See application file for complete search history.

(56) References Cited

U.S. PATENT DOCUMENTS

| 6,903 A | 11/1849 | Forbush | |
| 305,813 A | 9/1884 | Hamblin | |
| 513,834 A | 1/1894 | Smith | |
| 839,850 A | 1/1907 | Hummel | |
| 1,214,345 A | 1/1917 | Melby | |
| 1,257,191 A | 2/1918 | Crane | |
| 1,869,981 A * | 8/1932 | Paradise | A01D 34/18 56/298 |
| 2,133,277 A | 10/1938 | Bennett | |
| 2,332,840 A | 10/1943 | Boyer | |
| 2,427,306 A | 9/1947 | Schafer | |
| 2,931,159 A | 4/1960 | Hill | |
| 2,994,176 A | 8/1961 | Stroburg | |
| 3,066,468 A | 12/1962 | Kowalik | |
| 3,314,222 A * | 4/1967 | Scarnato | A01D 34/14 56/305 |
| 3,401,512 A | 9/1968 | Pool | |

(Continued)

FOREIGN PATENT DOCUMENTS

| CA | 2296258 | 9/2000 |
| CA | 2461790 | 11/2004 |
| CA | 2802972 | 7/2013 |

*Primary Examiner* — Thomas B Will
*Assistant Examiner* — Mai T Nguyen
(74) *Attorney, Agent, or Firm* — Adrian D. Battisor; Ade & Company Inc.; Ryan W. Dupuis

(57) ABSTRACT

In a sickle cutting system, including a plurality of guard fingers in a row across a cutter bar with each guard finger having an upwardly facing ledger surface and a plurality of hold-down members with each hold-down member comprising at least one hold-down finger, the guard fingers and hold down fingers thus forming cooperating overlying pairs between which the blades pass in the cutting action the guard fingers having no portion elevated above the ledger surface thereof in front of the tip of the blade and the guard fingers and blades having lengths from the cutter bar arranged such that a forwardmost tip of the guard finger is forward of the tip of the blade.

12 Claims, 14 Drawing Sheets

(56) References Cited

U.S. PATENT DOCUMENTS

| | | | |
|---|---|---|---|
| 3,664,103 A | | 5/1972 | McNair |
| 3,978,645 A | * | 9/1976 | Bennett .................. A01D 34/18 |
| | | | 56/310 |
| 4,380,889 A | | 4/1983 | Isbell |
| 4,644,738 A | * | 2/1987 | Krambeck ........... A01D 34/135 |
| | | | 56/259 |
| 4,894,979 A | * | 1/1990 | Lohrentz ................ A01D 34/18 |
| | | | 56/305 |
| 5,054,277 A | | 10/1991 | Schumacher, II |
| 5,694,754 A | * | 12/1997 | Shuknecht ............. A01D 34/17 |
| | | | 56/298 |
| 6,467,246 B1 | | 10/2002 | McCredie |
| 7,124,567 B1 | | 10/2006 | Adamson |
| 7,313,903 B2 | | 1/2008 | Schumacher |
| 7,503,162 B2 | | 3/2009 | Herlyn |
| 2005/0166566 A1 | | 8/2005 | Majkrzak |
| 2008/0000210 A1 | | 1/2008 | Jolly |
| 2008/0006016 A1 | * | 1/2008 | Snider .................. A01D 34/135 |
| | | | 56/297 |
| 2013/0186053 A1 | | 7/2013 | Talbot |

* cited by examiner

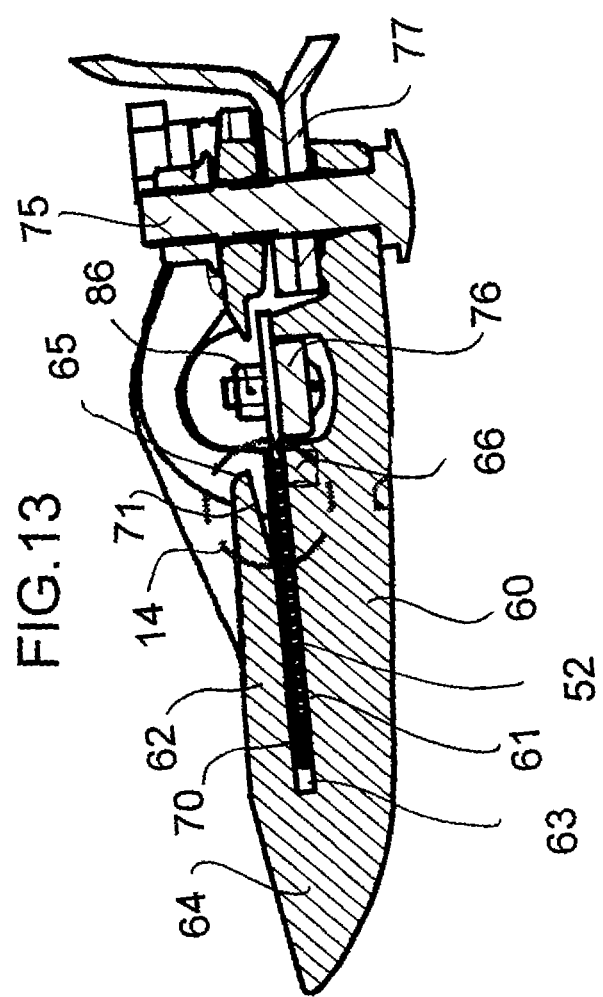

STUB GUARD FOR A SICKLE CUTTER SYSTEM

This invention relates generally to a stub guard for a sickle knife cutter system for harvesting crop with improved cutting action.

BACKGROUND OF THE INVENTION

The present invention relates generally to a crop cutting device comprising a frame structure arranged for forward travel over ground having a standing crop thereon; a cutter bar secured to the frame structure and extending transversely across a front end of said frame structure; a plurality of knife guards mounted in spaced relation along said cutter bar and projecting forwardly therefrom in transverse alignment; each of said guards having an upwardly facing ledger surface with opposed side edges thereof arranged to provide first and second shearing edges; a sickle bar mounted in transversely extending position and being driven for reciprocating movement relative to said knife guards; the sickle bar having a plurality of knife blades mounted thereon for movement therewith; each of the knife blades having a cutting surface for passing across the ledger surface of the knife guards and an opposed surface; each of the knife blades having two side cutting edges which are beveled from the opposed surface to the cutting surface to cooperate with said shearing edges of said knife guards; the sickle bar being driven to carry the knife blades back and forth between the knife guards.

It is well known that many sickle knives of this general type include a conventional or pointed guard where the guard is formed as an integral element which includes a base piece attached to the cutter bar and defining the ledger surface and a nose piece projecting forwardly from the ledger surface in front of the front edge of the blade which is generally pointed at a leading end so as to separate the crop to each side of the guard. This nose piece also stands up in front of the ledger surface to protect the front edge of the blade and includes a rearwardly extending shelf over the ledger surface which forms a slot with the ledger surface through which the blade passes. Guards of this type include separate hold down members between the guards which apply downward pressure on the cutter bar to press the blades against the ledger surface.

Pointed guards generally feature a point with a cut slot that the sickle blades reciprocate in and out of. Various types of hold-down arrangement are used to apply pressure to the sickle to keep its shearing surface in close contact with the guard ledger as cutting occurs. Usually these are located between the guard point or at the rear edge of the sickles. Most are sheet metal and feature easy adjustment using a hammer or a simple single point threaded adjustment. By keeping the hold-downs separate from the guards fewer hold-downs than points may be used to reduce the cost and number of adjustments required. Pointed guards have found much favor in easier cutting conditions due to the ease of adjustment and superior performance.

Another form of guard is known as a stub guard which is formed in two separate pieces including a base piece which carries the ledger surface and a top piece which extends over the ledger surface. The pieces are separate and separately adjustable relative to the cutter bar so that the top piece can apply pressure onto the blade to press it onto the ledger surface. The pieces terminate at a front edge which is just behind the front edge of the blade so that the front edge of the blade is presented to the crop.

In tough cutting, stub or no-clog guards have found the most favor. Stub guards use a separate top and bottom guard pieces that spaced slightly more than one sickle blade thickness apart create a slot for the blade to operate in. The front edge of the blade protrudes slightly past the front tip of the two guards. This feature is what originally gave stub-guards their non-clogging self-cleaning action. A major improvement in stub guard technology was made when fully adjustable top hold-down assemblies were introduced. These arrangements allowed the gap to be controlled much more precisely than previously so that the shearing surface of the blade was kept in close contact with the guard ledger surface. This adjustability allows the stub top piece to act as a much more effective hold-down than the hold-downs found on regular pointed guard systems.

The pointed guard has an advantage of presenting a point to the incoming crop so that crop is effectively divided around it. This is especially advantageous when the sickle blade is at or near the end or start of each stroke and a front edge of each blade, which is typically a blunt front edge of a width of the order of 0.5 inch, is hidden partially or entirely within the guard slot. Since the sickle bar velocity is lowest at or near the end or start of each stroke this gives the pointed guard a considerable advantage over the stub guard for most crops.

The guards can be formed as single elements separately mounted on the guard bar or as double or triple elements connected together side by side for common mounting and common adjustment relative to the guard bar. There is no reason why more elements might be included but this is not typical.

In some cases the arrangement is of the double sickle type where each sickle bar is essentially half the length of the cutter bar and the cutter bars reciprocate in opposite phase to minimize vibrating mass and vibrations. Usually the sickle bars are timed so that they move in opposite directions so that vibrations induced into the cutter bar assembly are minimized.

The sickle knife cutting system has been widely accepted as the most power efficient system due to the shearing action. However due to speed restrictions of generally less than 5 to 8 mph ground speed, other systems such as rotating flail systems have come into use since these can be operated at much higher ground speed of up to 14 mph while maintaining a high cutting efficiency. Such rotary systems have however much higher power usage, are limited in width and provide crop handling difficulties for forming effective swaths for drying of the crop.

It remains therefore an ongoing and highly desirable objective to construct a sickle knife system which can cut standing crop with sufficient cutting efficiency that the ground speed can be significantly increased. It is believed that the construction of a sickle cutting system which can operate at ground speeds of greater than 5 to 8 mph and up to 14 mph would enable the advantages of the sickle cutting action to take back the market currently being met by the flail systems.

Cutting crops such as soy beans where the bean pods can be located closely adjacent the ground typically requires low ground speeds of around 4 to 5 mph to ensure that the crop is cut and fed into the combine harvester without too much loss of the pods. Pods can be lost if the cutting action causes some or too many of the lowest pods to be left at the stubble or broken up by the cutting action. It would be highly desirable to increase cutting speed above the typical range of 4 to 5 mph so as to increase this to or above 6 mph.

Cutting crops such as hay or forage crops such as alfalfa or grasses typically allows higher ground speeds of up to 10 mph since the crop is more resistant to a poor or inefficient cutting action. It would be highly desirable to increase cutting speed above the typical range of up to 10 mph so as to increase this to or above 12 or even 14 mph.

The term "sickle bar" as used herein is intended to refer generally to a structure which supports all of the knife blades at the spaced positions along its length and is not intended to be limited to a single continuous element extending along the whole length of the structure. Thus the bar may be formed of different elements at different parts of the length and may include pieces below and above the blades.

SUMMARY OF THE INVENTION

According to the invention there is provided a sickle cutting apparatus comprising:

a plurality of stationary knife guards arranged to be mounted along a cutter bar;

a sickle bar mounted in transversely extending position and arranged to be driven for reciprocating movement relative to said knife guards;

the sickle bar having a plurality of knife blades mounted thereon for movement therewith;

each of the knife blades having a cutting surface for passing across the knife guards;

each of the knife blades having on first and second sides first and second side cutting edges converging toward a forward tip of the blade;

each knife guard comprising a base portion arranged to be mounted on the cutter bar and at least one guard finger mounted on the base portion so that the guard fingers are arranged to be mounted in a row along the cutter bar;

each guard finger having an upwardly facing ledger surface with opposed side edges thereof arranged to provide first and second shearing edges which cooperate with said side cutting edges of said knife blades;

and a plurality of hold-down members arranged to be mounted along the cutter bar;

each hold-down member comprising a base mounting member arranged to be attached to the cutter bar;

each hold-down member comprising at least one hold-down finger thereon carried on the base mounting member arranged to be at positions spaced longitudinally of the cutter bar so as to be cantilevered forwardly from the cutter bar to a position of a front tip of each hold-down finger located at a spacing in front of the sickle bar above the ledger surface of a respective one of the guard fingers;

the guard fingers and hold down fingers thus forming cooperating overlying pairs between which the blades pass in the cutting action;

the guard fingers having no portion elevated above the ledger surface thereof in front of the tip of the blade;

wherein the guard fingers and blades have lengths from the cutter bar arranged such that a forwardmost tip of the guard finger is forward of the tip of the blade.

Preferably also the guard fingers, blades and hold down fingers have lengths from the cutter bar arranged such that a forwardmost tip of the hold down finger is rearward of the tip of the blade.

Preferably the tip of the guard finger is longer than the tip of the blade by a distance up to 6.0 mm and preferably of the order of 3.0 mm.

Preferably the tip of the hold down finger is shorter than the tip of the blade by a distance in the range 1.5 to 10.5 mm and preferably of the order of 5.0 mm.

The stubble which is cut by the knife blades and is longer than the nominal cutting height is caused by the distance travelled over the ground while crop is in contact with and pushed by elements of the blades and guards as the elements move forward without cutting occurring. The elements include a trash bar of the guard and a serrated edge of the blade where the crop is pushed forward by engagement into a serration of the serrated edge.

It has been found, as described hereinafter, in relation to the embodiments particularly described, that a significant increase in ground speed while maintaining an acceptable level of cutting efficiency as measured by the average stubble length can be obtained by a combination of one or more of the features where:

a) The distance between the center line of the guards which is generally equal to the distance between the center line of the blades can be equal to the conventional length of 3.0 inches or may be reduced to a narrower width typically 2.5 or 2.0 inch. This distance may be equal to the stroke length so that a shorter stroke length can allow a significant increase in reciprocation rate. However the stroke length may be a multiple of the center line distance. Even where the stoke length is not reduced so that the increase in reciprocation rate cannot be achieved, the reduced center line distance has been shown to provide a significant advantage.

b) the length of the cutting edge of each knife blade as measured from a rearmost end of a cutting action to a forwardmost tip of the knife blade is increased from a conventional length to a length greater than 2.2 inches.

c) the width of the ledger surface of each guard at a position thereon aligned with the rear end of the cutting edge of each knife blade is increased from a conventional length to a length greater than 1.0 inches or 1.2 or 1.5 inches.

d) the front edge of the blade is formed with a pointed portion where the shape of an apex and side edges of the pointed portion are arranged to shed crop material engaging the point portion as the point portion is moved forwardly in the crop to one or other side of the point portion for cutting and to avoid pushing crop forwardly by the point portion.

This combination surprisingly provides a crop cutting efficiency which is sufficiently high that the ground speed can be increased from the conventional of the order of 5 to 8 mph to 12 to 14 mph. This increase is significant and significantly alters the ability of the draper header to harvest forage crops such as alfalfa at greater than 10 mph and up to 14 mph and to harvest soy beans at greater than 5 mph and up to 6 or 7 mph.

The invention herein can be defined as or relate to the method of cutting, the header for cutting, the guards and/or the knife blades. Thus each of these components of the invention includes aspects of the invention which distinguish that component from the prior art as defined hereinafter.

A first improvement can therefore be obtained by providing a knife blade which is narrower than conventional system so that typically the width is equal to approximately 2.0 inches center to center while providing a blade which has a length greater than conventional system so that the length from the trash bar to the tip is greater than 2.0 inches, greater than 2.2 inches or 2.5 inches and typically of the order of or greater than 2.75 inches.

This can be further combined with an arrangement in which the width of the guard at the trash bar is increased so that the width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Typically each of the knife blades is generally triangular in shape so that the side edges converge to a front edge at an angle of the order of 60 degrees to the direction of reciprocating movement. The blade has a bottom cutting surface for passing across the ledger surface of the knife guards and an opposed or upper surface. The two converging side cutting edges are beveled from the upper surface to the bottom cutting surface to cooperate with the shearing edges of said knife guards. In addition the beveled side edges are typically serrated with grooves running in a direction longitudinal to the reciprocating direction. In order to maximize the cutting action, the length of the cutting edge is substantially the maximum length extending from the trash bar at the rear to a position close to the front edge of the blade.

The fore-aft length of a blade has traditionally been in the order of 45 mm (1.75 in) from the front of the trash bar, that is the rearmost cutting location or the rear of the cutting action, to the tip of the section, or 55 mm (2.2 in) from the front edge of the knife back to the tip of the section. Traditionally this dimension is usually similar to the length of the cutting edge.

In this new arrangement, the fore-aft length of the blade is increased substantially. Thus the length of cutting edge of each sickle blade from a rearmost end of the cutting action at the trash bar, or to the rear of the shearing action on the ledger surfaces, to a front edge of the blade in the present invention is greater than 1.75 inches. This can lie in the range 2.2 to 3.0 inches.

The term "trash bar" as used herein typically is defined by a specific transverse bar interconnecting to the ledger surfaces of the lower guards but does not require the provision of a specific bar member extending across the blades but merely relates to the position of that component of the system where the crop is halted as it moves rearwardly between the guard fingers. Thus at some point the crop is halted so that it remains in the position where it can be engaged by the side edges of the blades and can be cut in the shearing action relative to the side edges of the ledger surface. This element which halts the crop movement is called herein the "trash bar".

This also reduces the angle of inward inclination of the cutting edge from the typical 30 degrees to an angle less than 20 degrees and typically of the order of 15 degrees and in the range 15 to 30 degrees.

Thus in one example the blade has a width of 2.0 or 3.0 inches at the base and a length from the front of the trash bar to the tip of 2.5 inches.

It is common practice for sickle sections, of the current type having beveled and serrated side edges, to have a front edge in the order of 15 mm (0.6 inches) wide. When used with a pointed guard, this is not as much of a problem as this edge is sometimes in the shadow of the guard. However, even with pointed guards and certainly when used with stub guards, the wide tip has the potential for running down crop or pushing the crop forwardly with the forward motion of the cutter bar, thus leaving more long uncut stems greater in length than the nominal minimum value above thus significantly increasing the average length with is the measure herein of cutting efficiency. In present invention the blade is designed with a pointed tip, thus eliminating the problem when used with stub guards.

In some crop conditions e.g. forage with a mat of wet leaves near the ground, pointed guards will tend to plug due to "mouse nesting" on the guard point. It is therefore important that a cutting system works well with stub guards.

The intention is therefore to provide a sickle blade which is as pointed as reasonably practical. A sharp point is difficult to obtain so that typically the front edge is smoothly curved with a radius of curvature less than 0.5 inches thus defining a front apex which is sufficiently narrow to shed crop stalks to each side. That is, each knife blade has a front point portion in front of the cutting edges which has side edges converging to front apex where the apex and the side edges are shaped and arranged such that crop material engaging the point portion, as the point portion is moved forwardly in the crop, is shed to one or other side of the point portion for cutting and is not pushed forwardly by the point portion. In the present arrangement the front apex is not a point as this can be damaged but is a curved front edge of a radius of curvature less than 0.5 inches and preferably less than 0.25 inches. From this curvature the sides of the pointed portion diverge rearwardly at an angle approximately equal to or slightly greater than the angle of the cutting edges.

In a blade which has a center to center spacing of the order of 2.0 inches and a length from apex to trash bar greater than 2.0 inches, the angle of the side edges of the blade is less than 20 degrees and can be as low as 15 degrees.

The angle of the side edges of the front point portion can be greater and is typically in the range 30 to 45 degrees and preferably of the order of 35 degrees.

This curvature at the apex and the angle of divergence from the curved apex acts to shed the crop to the sides and to avoid trapping and pushing the crop forwardly.

While this is the optimum arrangement, a practical construction may have a straight line across the apex with a transverse width which is much less than the conventional 0.6 inches and is typically less than 0.25 inches.

Thus each knife blade has a front point portion in front of the beveled and serrated side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Preferably the beveled side sedges are serrated in a direction at right angles to a forward direction.

Preferably the pointed portion has a thickness at the apex equal to that of the blade.

Preferably the beveled edges are reduced in width at as they approach the pointed portion leaving a strip of the upper surface between the beveled edges having thickness equal to that of the blade with side edges of the strip being parallel to the center line of the blade.

Preferably at this strip the beveled edges become narrower as the beveled edge approaches the front pointed portion of the blade.

Preferably the beveled edges and the serrations therein terminate at a position spaced from the apex of the pointed portion such that the front pointed portion forms an arrowhead shape in front of a forwardmost one of the serrations with the width of the front pointed portion being substantially equal to the width of the side edges at the forwardmost one of the serrations.

Preferably a center line spacing between each knife blade and the next is less than 3.0 inches, preferably less than 2.5 inches and more preferably of the order of or equal to 2.0 inches. Thus the center line spacing can be equal to the conventional value of 3.0 inches.

Preferably a length of each knife blade from the trash bar to a forwardmost tip of the knife blade is greater than 2.0 inches, preferably greater than 2.2 or 2.5 inches and more preferably greater than 2.75 inches.

Preferably the front point portion has side edges which are not sharpened.

Preferably the radius of curvature of the front pointed portion at the apex is less than 0.5 inch and more preferably less than 0.25 inch. The characteristics of the blade defined above, where it is narrower than conventional, 2.0 inches as opposed to 3.0 inches, and significantly longer, greater than 2.2 inches or 2.5 to 2.75 inches as opposed to 2.2 inches places considerable limitations on the shape and arrangement of the beveled and serrated edges.

In order to form the pointed portion at the front edge in front of the beveled edges, the beveled edges are reduced in width as they approach the front edge leaving a strip of the upper surface between the beveled edges with side edges of the strip parallel to a center line of the blade. Thus at this strip the beveled edge becomes narrower and the grooves in the edge get shorter as the beveled edge approaches the front apex of the blade. The beveled edges and the serrations therein terminate at a position spaced from the front apex to define an arrow-head shaped pointed portion in front of the beveled edges which imparts sufficient strength to the construction to allow the formation of the serrations. The thickness of the blade through the main body of the blade excluding the beveled edges is constant so that the pointed portion and the apex have the same thickness as the rest of the main body of the blade and the bevel which reduces the thickness does not extend to the apex.

The cutting efficiency and therefore stubble length are also affected by the width of the cutting edge of the knife guard. Generally, the width at the rear of the cutting edge on the guard is in the order of 25 mm (1.0 in). In the arrangement of the present invention that width is substantially increased. Thus the width of each guard at a position thereon aligned with the rear end of the cutting edge of each blade is greater than 1.0 inches or 1.2 inches or 1.5 inches. The maximum width of the guard is slightly less than the center to center spacing of the blades since it is necessary to leave a gap between the guards at the back to prevent pinching the crop and to allow the crop to reach the back for the rearmost cutting action. Thus with a blade center to center spacing of 2.0 inches the width of the guard is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard can have a width which is between 0.5 and 0.1 inches less than the width of the blade.

Thus the arrangement provided herein provides a center line spacing between each guard finger and the next which is in some cases less than 3.0 inches and more preferably 2.0 inch where a width of each guard at the rear trash bar is greater than 1.5 inches and preferably 1.75 inches.

Thus a width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Preferably the stroke length is equal to the center line spacing between the knife blades.

Preferably, at the position in the stroke where the center line of the knife blades is aligned with the center line of the guard fingers, the side cutting edges of the knife blades substantially directly overlie the side edges of the ledger surface.

Preferably each knife blade has a front point portion in front of the side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Of course ground speed can be increased if the operator has no regard for cutting effectiveness and the quality of the cut crop. This is of course unacceptable.

One measure of cutting effectiveness is that of the length of stubble which remains on the ground. If the cutting blades run at a nominal height from the ground then they will theoretically cut all crop to a nominal length equal to the height of the blade from the ground. However this does not occur as the sickle knife moves forwardly since not all crop is cut immediately as it enters the cutting system. As some cutting is delayed and the crop pushed forwardly by engagement with elements of the cutting system to bend over from the normal upstanding position, then some stubble will have a length exceeding the nominal length and this length difference will increase as the ground speed increases. Thus cutting effectiveness can be measured by detecting and measuring the average length difference of stubble which exceeds this nominal length.

An acceptable effectiveness is defined where the average stubble length difference, that is the average length beyond the minimum or nominal length defined by the distance of the blades from the ground, is less than 1.0 inches, as measured at a set speed of 10 mph. Thus for example where the nominal height is a typical 1.5 inches, an acceptable effectiveness is where a measured average length is no greater than 2.5 inches.

Of course machines can run at different speeds and there is no intention herein to limit the speed to a particular value. However as the stubble length is of course speed dependent, it is necessary, in order to analyze the system, to set a predetermined value at which the stubble length is measured.

Of course in a practical situation there may be failures in proper cutting action leaving some crop stalks greater than the allowed length difference defined above. However discarding such discernible failures in the cutting action which are due to cutting errors and are not a measure of the actual efficiency of the proper cutting, a proper efficiency is defined by the average stubble length as set forth above.

Thus the best measure of cutting effectiveness is the stubble length that is left after cutting. The requirement however will vary depending on the crop. For example for a wheat crop, it will not be critical that a short stubble length be maintained, as the heads are generally high on the plant.

In the case of hay (alfalfa) it will be important that a fairly short stubble length is maintained so that a significant quantity of crop is not left in the field. A typical acceptable total average stubble length in this case would be in the area of 2.75 inches (that is 1.25 inches longer than the nominal minimum length). Thus the ground speed can typically exceed the 10 mph value set above for the above analysis and may be as high as or higher than 14 mph.

In the case of soybeans, the acceptable average stubble length depends on the general height of the lowest bean pod on the plants. The acceptable average stubble length thus varies from about 2 to 2.5 inches or 0.5 to 1.0 inches greater than the nominal value. In this case a speed of less than 10 mph is likely to be desirable.

The guard fingers, knife blades and the trash bar are arranged so as to provide a cutting action on the crop in which:

in a first cutting stroke, each knife blade moves across from one guard finger to the next in a first direction so as to cut crop located on said first side of the knife blade between the first cutting edge of the knife blade and the next guard finger by the shearing action while leaving uncut crop located on the second side of the knife blade;

and, in a second cutting stroke, each knife blade moves across from the next guard finger to said one guard finger in a second direction so as to cut crop located on the second side of the knife blade between the second cutting edge of the knife blade and said one guard finger by the shearing action, including said uncut crop, while leaving uncut crop located on the second side of the knife blade.

While this crop remains upstanding before it is cut, the stubble length remains at the nominal value. However as soon as the crop is pushed forwardly by a non-cutting surface or a cutting surface which is not in a cutting action at that position in the stroke, it begins to bend over and its length when it is cut is increased from the nominal value by the distance the crop is bent forwardly.

The guard fingers, knife blades and the trash bar are shaped and arranged therefore to provide a percentage cutting inefficiency of less than 35%, 30% or 25%, at the above set speed of 10 mph and at a sickle stroke rate set at a value which provides inertia values equal to those obtained by a three inch stroke at 750 rpm, where percentage cutting inefficiency is calculated as follows:

within a rectangular area defined by the length of the knife stroke and the ground distance travelled during one knife cycle, the sum of any areas of crop in which the crop remains uncut until it reaches an element of the cutting system by which the crop is pushed forward, without cutting, by contact with the element as the element moves forward;

divided by:

the rectangular area defined by the length of the knife stroke and the ground distance travelled during one knife cycle.

Thus in a first cutting stroke, there is an area of crop located on the second side of each knife blade in which the crop is gathered by contact with the guard fingers and trash bar as the guard fingers and trash bar move forward while the knife blade is cutting on said first side of said knife blade. Symmetrically in a second cutting stroke, there is an area of crop located on the first side of each knife blade that is gathered by contact with the guard fingers and trash bar as the guard fingers and trash bar move forward while the knife blade is cutting on said second side of said knife blade.

The elements which can engage and push the crop while not cutting the crop as the blade moves away from those elements include the trash bar and the serrated edge of the blade on the understanding that crop cannot slide along the serrated blade but instead will remain at a particular serration and be pushed forward by the blade at that location until the return stroke cuts the crop.

There is in many prior art arrangements an area that is generated by any crop which is pushed forward by contact with a front edge of the knife blade. In the present invention the blade is of a shape to shed the crop thus reducing this significant inefficiency.

The definition of inefficiency can also be applied at different ground speeds wherein the percentage cutting inefficiency can calculated at 6 mph and at a sickle stroke rate set at a value which provides inertia values equal to those obtained by a three inch stroke at 600 rpm, is less than 30%; or the percentage cutting inefficiency can be calculated at 10 mph and at a sickle stroke rate set at a value which provides inertia values equal to those obtained by a three inch stroke at 750 rpm, is less than 35%; or the percentage cutting inefficiency can be calculated at 14 mph and at a sickle stroke rate set at a value which provides inertia values equal to those obtained by a three inch stroke at 900 rpm, is less than 40%.

The reason for identifying the theoretical calculated efficiency at three different speeds of 6, 10 and 14 mph is that different machines can be designed and arranged to travel at different speeds.

Thus for example a 40 foot header used as a straight cut header for a combine can have a sickle knife length of 40 feet and can be designed to travel in the range 2 to 8 mph so that using a pre-set speed of 6 mph and a stroke rate of 600 rpm falls reasonably in the range of a machine of this type.

The present invention sets out that, at the pre-set speed and pre-set stroke rate, the shape and arrangement of the cutting system is such that it obtains the stated inefficiency. Of course, at different speeds and stroke rates, the same cutting system will have different inefficiencies, but in order to determine whether a cutting system provides the inefficiency of the present invention, pre-set parameters must be determined to allow the calculation to be carried out.

Thus as another example, at 14 mph the machine concerned can be of the type for cutting hay or forage crops and will have a header of for example 20 feet in width with two 10 foot sickle knives.

At 10 mph the machine has intermediate characteristics. The pre-set characteristics used therefore are set forth as alternative to determine the actual theoretical calculated inefficiency of the cutting system of a machine and the calculation can be carried out at those pre-set characteristics selected from the above different examples which best match the range of operation of the machine concerned.

As defined in the figures hereinafter, the sickle stroke rate for a 4.0 inch stroke, which provides inertia values equal to those obtained by a 3.0 inch stroke at 750 rpm, is 650 rpm and the sickle stroke rate for a 2.0 inch stroke, which provides inertia values equal to those obtained by a 3.0 inch stroke at 750 rpm, is 918 rpm.

The pre-set parameters for the inefficiency calculation are set out in table 23 hereinafter.

In order to achieve the above decrease in cutting inefficiency, the following characteristics are preferably to be selected, although other characteristics may when analyzed provide the same level of inefficiency:

a center line spacing between each knife blade and the next which is less than 3.0 inches and preferably of the order of 2.0 inches.

a length of each knife blade from the trash bar to a forwardmost tip of the knife blade which is greater than 2.0 inches and preferably of the order of 2.75 inches.

a width of each guard at the rear trash bar which is greater than 1.0 inches and preferably, for a guard spacing center to center of 2.0 inches of the order of 1.75 inches. That is the width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Preferably the stroke length is equal to the center line spacing between the knife blades.

Preferably at the position in the stroke where the center line of the knife blades is aligned with the center line of the guard fingers, the side cutting edges of the knife blades substantially directly overlie the side edges of the ledger surface.

Preferably each knife blade has a front point portion in front of the side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Preferably the front point portion has side edges which are not sharpened.

While much of the description herein is directed to a narrower cutting system using blades of 2 inch width, the same cutting action and operation of the blades can be obtained with blades which have a spacing from tip to tip of 3 inches.

Preferably each blade with a base portion and only two cutting edges is a separate component from each of the other blades so that the side edges of each blade lie immediately adjacent the side edges of the next adjacent blades. However blades can be formed in pairs connected to the same base Preferably the blade has only a single cut out opening luing symmetrically on the center line and converging to an apex directed toward the apes of the blade. However more than one cu out opening can be provided with different shapes.

Preferably the cut out opening has a rear edge parallel to a rear edge of the blade, two side edges substantially parallel at right angles to the rear edge and two converging edges extending from the side edges to a forward apex.

Preferably the length of each blade from the transverse line defining the rearmost cutting action to the forwardmost tip of the knife blade is greater than 2.5 inches. A maximum of less than 2.9 inches is preferred.

BRIEF DESCRIPTION OF THE DRAWINGS

FIG. 13 is a cross sectional view along the lines 13-13 of FIG. 12.

DETAILED DESCRIPTION

Figure 1:
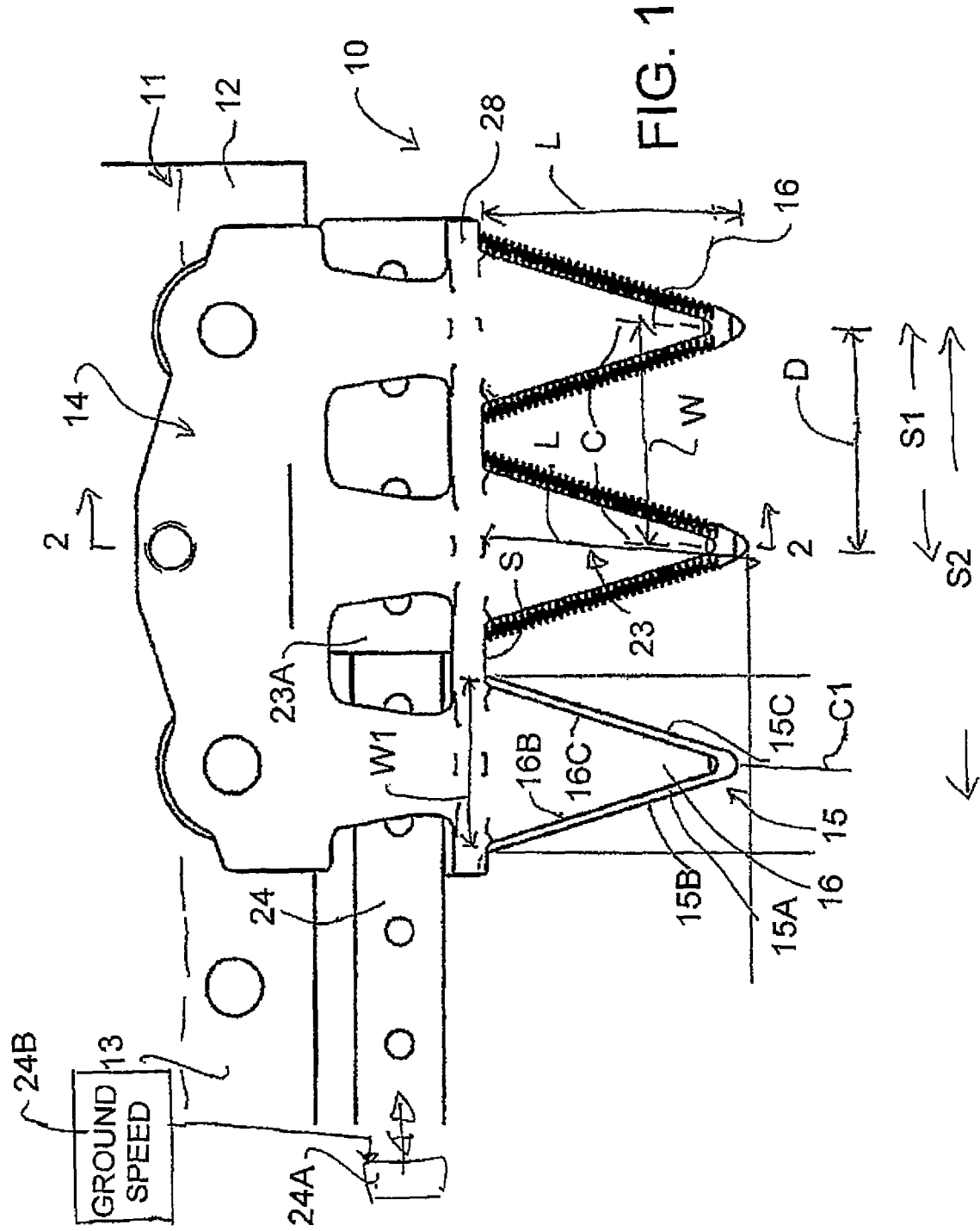
FIG. 1 is a top plan view of a part of header showing a portion of the sickle knife according to a first embodiment of the present invention using a stub guard.
Figure 2:
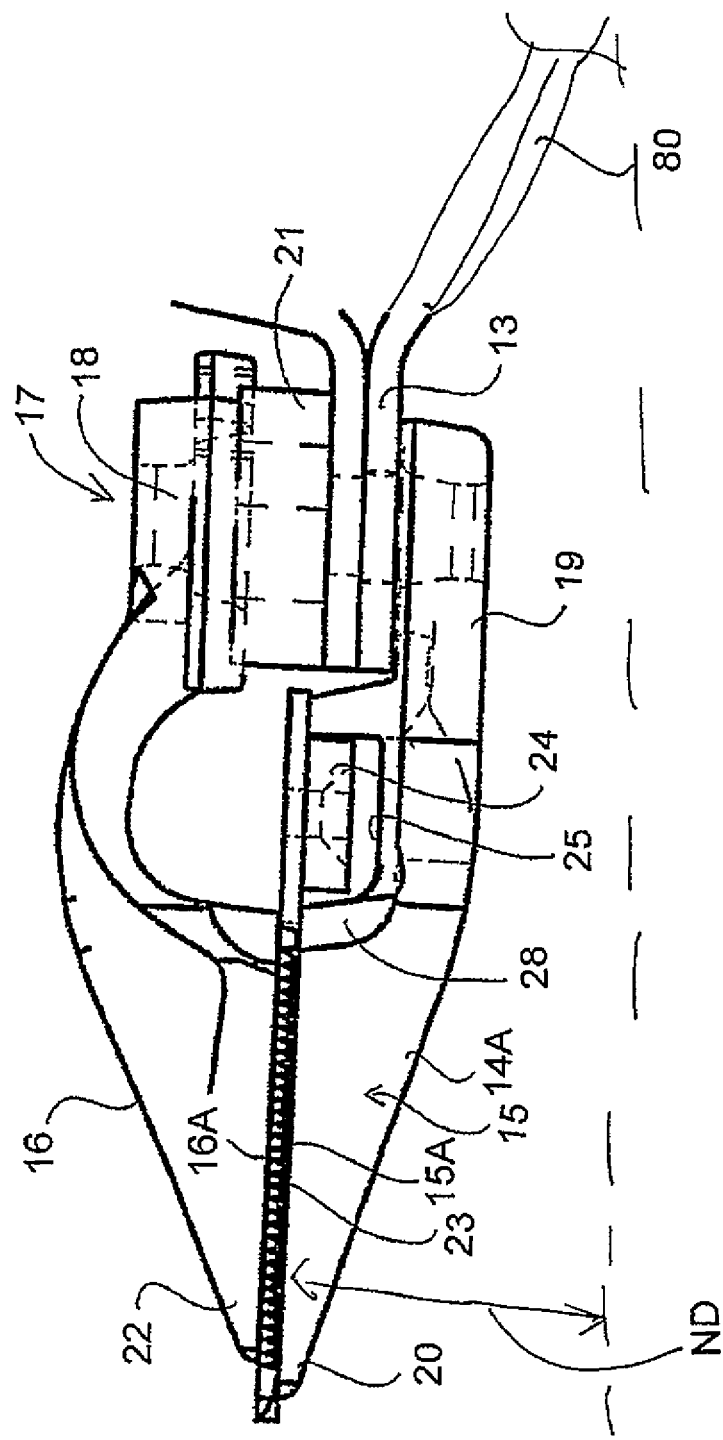
FIG. 2 is a cross-sectional view along the lines 2-2 of FIG. 1.

In FIGS. 1 and 2 is shown a first embodiment of a crop cutting device generally indicated at 10. Only a part of the complete machine is shown since the remainder of the machine may vary widely depending upon requirements and since the construction is of course well known to a person skilled in the art. In this embodiment as shown, there is a frame generally indicated at 11 which forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to the frame structure which supports the guard bar in fixed position across the front edge of the frame for a cutting action of the crop cutting device on the standing crop.

Each knife guard 14 includes one or more guard fingers 14A so that guards can be arranged with a single finger, pair of fingers or triples. As shown the guard bar forms a triple guard construction with three fingers where a series of such guards are mounted on the guard bar 13 at spaced positions along the length of the guard bar. In the embodiment as shown, only one of the guards is shown but it will be appreciated that there are additional guards as required to provide a crop cutting device of a required width.

The knife guards shown in FIGS. 1 and 2 are basically of a conventional construction of a stub guard in that each guard finger 14A includes a lower portion 15 and an upper portion 16. These two portions are mounted on the guard bar 13 by a mounting arrangement 17 including bolts 18. The mounting arrangement thus attaches a rear end 19 of the lower portion 15 rigidly on the underside of the bar 13 so that the fingers of the guard project forwardly from the bar to a front nose 20. Similarly the upper portion 16 is mounted on the guard bar 13 by an adjustment plate 21 attached onto the same bolts 18. Upper portion 16 has fingers which extend forwardly to a nose 22.

In the embodiment shown the guards are stub guards so that the noses 20, 22 of the upper and lower portions substantially overlie one another and confine between them the blades 23 of the sickle bar or knife back 24.

Each pair of guards thus includes two guard elements each defined by an upper portion and a lower portion and the guard elements are shown in FIG. 1 at 15 and 16. A front crop guide bar or trash bar 28 is also provided. Between the mounting bar 21 and the front guide bar 28 is provided a channel 25 within which the sickle bar or knife back 24 is mounted for reciprocating movement.

The trash bar may form a continuous bar member extending along the lower guard portion 15 in front of the bar 24 to prevent any crop reaching that area. However the trash bar may be formed by any part of the system which prevents the crop from moving rearwardly beyond the rear end of the cutting edges of the blades.

There may be a single sickle bar driven from one end or in some cases there are two sickle bars driven from opposite ends and meeting in the middle. The sickle bar or bars are driven by the reciprocating drive motor (not shown but conventional) such that the bar reciprocates back and forth.

In some cases the bar reciprocates by a distance S1 equal to the space between the nose of one guards 15, 16 and that of the next along the guard bar 13 so that the blades reciprocate from a position with the center line of the knife aligned with the center line of the first guard to a position aligned with the next and back to the first. In other cases, the reciprocation stroke may be as shown at S2 a multiple of, typically double, the distance between the guards so that the knife moves from a first guard finger across a second to a third and back to the first. This arrangement reduces the available reciprocation rate due to increased acceleration forces but reduces the number of reversals.

Figures 3, 4:
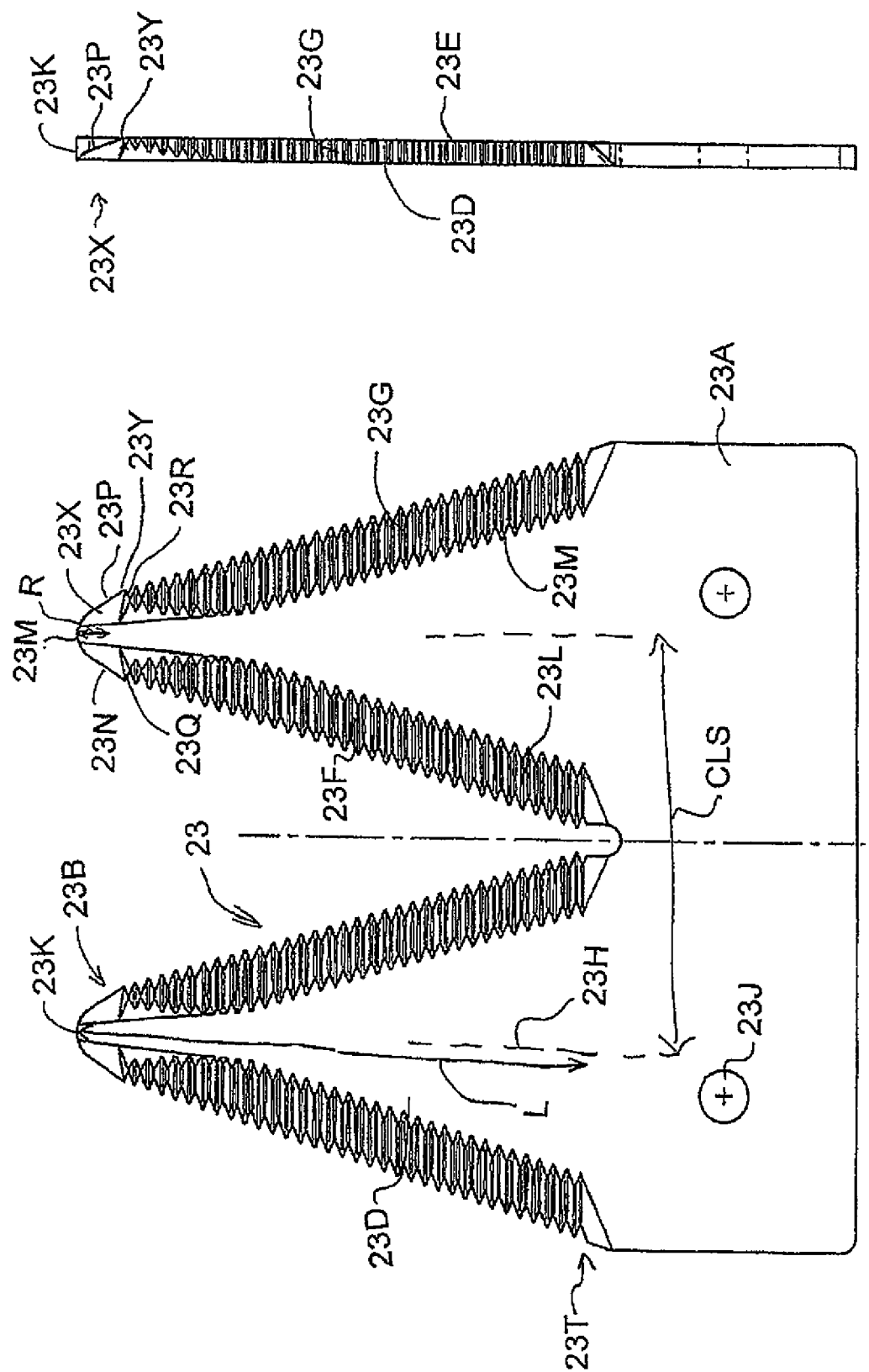
FIG. 3 is top plan view of a knife blade for use in the sickle knife of FIG. 1.
FIG. 4 is a side elevational view along of the knife blade of FIG. 3.

Each sickle bar comprises the support bar member 24 and the plurality of blades indicated at 23. As shown the blades are formed in pairs mounted on a common base as shown in FIG. 3, but individual blades may be provided or in some cases the blades may have more than two on the same base.

Each of the blades forms a generally triangular-shaped member which has a rear end or base 23A bolted to the bar and converges from the rear end to a front end 23B. Each of the blades has a top surface 23D and a bottom surface 23E. Each of the blades has a side edge 23F and a second side edge 23G. The sides edges are beveled from the top surface down to the bottom surface 23E so that a sharp edge is formed at the bottom surface at each of the side edges. The blades are also serrated at each cutting edge with grooves 23L, 23M extending parallel to the bars 24 that is at right angles to a center line 23H.

The top member 16 acts to hold the blades downwardly into engagement with the top ledger surface 15A of the bottom portion 15. The bottom portion 15 has two side edges of the ledger surface 15A as best shown in FIG. 2 with those side edges 15B and 15C acting as side edges of the ledger surface 15A. Thus the cutting action of the blades occurs between the ledger 15A and the bottom surface 23E of the blade as the blade reciprocates from its position at one of the guards to its position at the next adjacent one of the guards. In this cutting action, therefore, the side edge of the blade moves across the space between the guards and enters onto the ledger surface of the next guard in a cutting action between the bottom surface of the blade and the top surface of the guard which are immediately adjacent and generally in contact or at least closely adjacent to provide a shearing action on the crop.

In these guards, the upper portion 16 acts merely as a hold down member contacting the upper surface of each of the blades so as to prevent it from moving away from the ledger surface 15A by applying pressure to that upper surface 23D of the blade and holding the blade in contact with or closely adjacent the ledger surface 15A of the bottom portion where the cutting action occurs. The upper portion 16 therefore as shown in FIG. 1 has side surfaces 16B and 16C of the bottom surface 16A which is narrower than the ledger surface 15A of the bottom portion 15.

The mounting and adjustment arrangements for the bottom portion 15 and the upper portion 16 can vary in accordance with a number of different designs readily available to a person skilled in the art. It suffice to say that the hold down portion 16 is adjustable so that the gap between the bottom surface of the hold down portion and the ledger surface of the bottom portion 15 can be adjusted to allow the sliding action of the blades while holding the blades in the required position.

The disclosures of the following documents of the present Applicants are incorporated herein by reference or may be referred to for details of the construction not provided herein. These show various conventional details of the sickle knife system which can be used in the arrangement herein but are not described as they are known to persons skilled in the art.

U.S. Pat. No. 7,328,565 (Snider) issued Feb. 12, 2008;
U.S. Pat. No. 4,894,979 (Lohrentz) issued Jan. 23, 1990
U.S. Pat. No. 4,909,026 (Molzahn) issued Mar. 20, 1990.
U.S. Pat. No. 6,962,040 (Talbot) issued Nov. 8, 2005.
U.S. application Ser. No. 13/680,557 filed Nov. 19, 2012 based on a Provisional application 61/577,427 filed Dec. 19, 2011 (Talbot) relating to an adjustable hold down.

In FIG. 1, a drive for knife bar 24 is indicated schematically at 24A. This can comprise any suitable drive system known to persons skilled in this art of a type which can generate a stroke S1 of 2 inches at a drive rate of typically 918 rpm. The system can also be arranged in an alternative embodiment to drive the stroke S2 of 4 inches in which case the reciprocation rate may be lower. The drive system 24A includes an input from a ground speed indicator 24B which allows automatic adjusting of the stroke rate of the drive system 24A in dependence on ground speed. As the system herein provides a cutting efficiency which is higher than that of previous designs and suitable for cutting at speeds as much as 14 mph, it is possible when running at lower ground speeds such as less than 10 mph to reduce the drive rate of the knife since the maximum cutting effect is not required at those lower ground speeds. Thus the system can be arranged to automatically control the knife speed to a lower fixed value when the ground speed is less than a predetermined set value or to provide a proportional control of the drive speed.

The knife blade 23 is narrower than conventional system so that typically the width W is equal to the stroke length which is approximately 2.0 inches center C to center C while providing a blade which has a length L greater than conventional system so that the length from the trash bar 28 to the tip 23K is greater than 2.0 inches and typically of the order of or greater than 2.75 inches.

This can be further combined with an arrangement in which the width W1 of the guard ledger surface at the trash bar 28 is increased so that the width W1 of each guard at the rear trash bar is equal to the maximum width which can be obtained while leaving a space S at the trash bar between the ledger surfaces of the order of 0.5 inch or the distance necessary to avoid pinching of crop stalks between the ledger surfaces.

Typically each of the knife blades is generally triangular in shape with straight side edges 23F, 23G. However other shapes of the side edges 23F, 23G in plan such as convex or concave can be used. Thus the side edges 23F, 23G converge to the front apex 23K at an angle of the order of 60 degrees to the direction of reciprocating movement. The two converging side cutting edges 23F, 23G are beveled from the upper surface 23D to the bottom cutting surface 23E to cooperate with the shearing edges of the knife guards. In addition the beveled side edges are serrated with grooves 23L, 23M running in a direction longitudinal to the reciprocating direction. In order to maximize the cutting action, the length of the cutting edge is substantially the maximum length extending from the trash bar 28 at the rear to a position close to the front apex 23K of the blade.

In this new arrangement, the conventional fore-aft length of the blade is increased substantially. Thus the length of cutting edge of each sickle blade from a rearmost end of the cutting action at the trash bar 28, or to the rear of the shearing action on the ledger surfaces 15A, to the front apex 23K of the blade in the present invention is greater than 1.75 inches. This can lie in the range 2.2 to 3.0 inches.

The cutting efficiency and therefore stubble length are also affected by the width of the cutting edge of the knife guard. In the arrangement of the present invention that width is substantially increased. Thus the width W1 of each guard at the trash bar 28 is greater than 1.0 inches. The maximum width of the guard is slightly less than the center to center spacing of the blades since it is necessary to leave the gap S between the guards at the back to prevent pinching the crop and to allow the crop to reach the back for the rearmost cutting action. Thus with a blade center to center spacing of 2.0 inches the width W1 of the guard is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard has a width which is between 0.5 and 0.1 inches less than the width of the blade.

At the position in the stroke shown in FIG. 1 where the center line C of the knife blades is aligned with the center line C1 of the guard fingers, the side cutting edges of the knife blades 23F, 23G substantially directly overlie the side edges 15B, 15C of the ledger surface 15A.

Each knife blade has a front point portion 23X in front of the side cutting edges 23F, 23G which front point portion has side edges 23N, 23P converging to the front apex 23K, where the apex and the side edges of the front point portion 23X are shaped and arranged such that crop material engaging the front point portion, as the point portion is moved forwardly in the crop, is shed to one or other side of the front point portion for cutting by the side cutting edges and is not pushed forwardly by the front point portion 23X.

Figure 5:
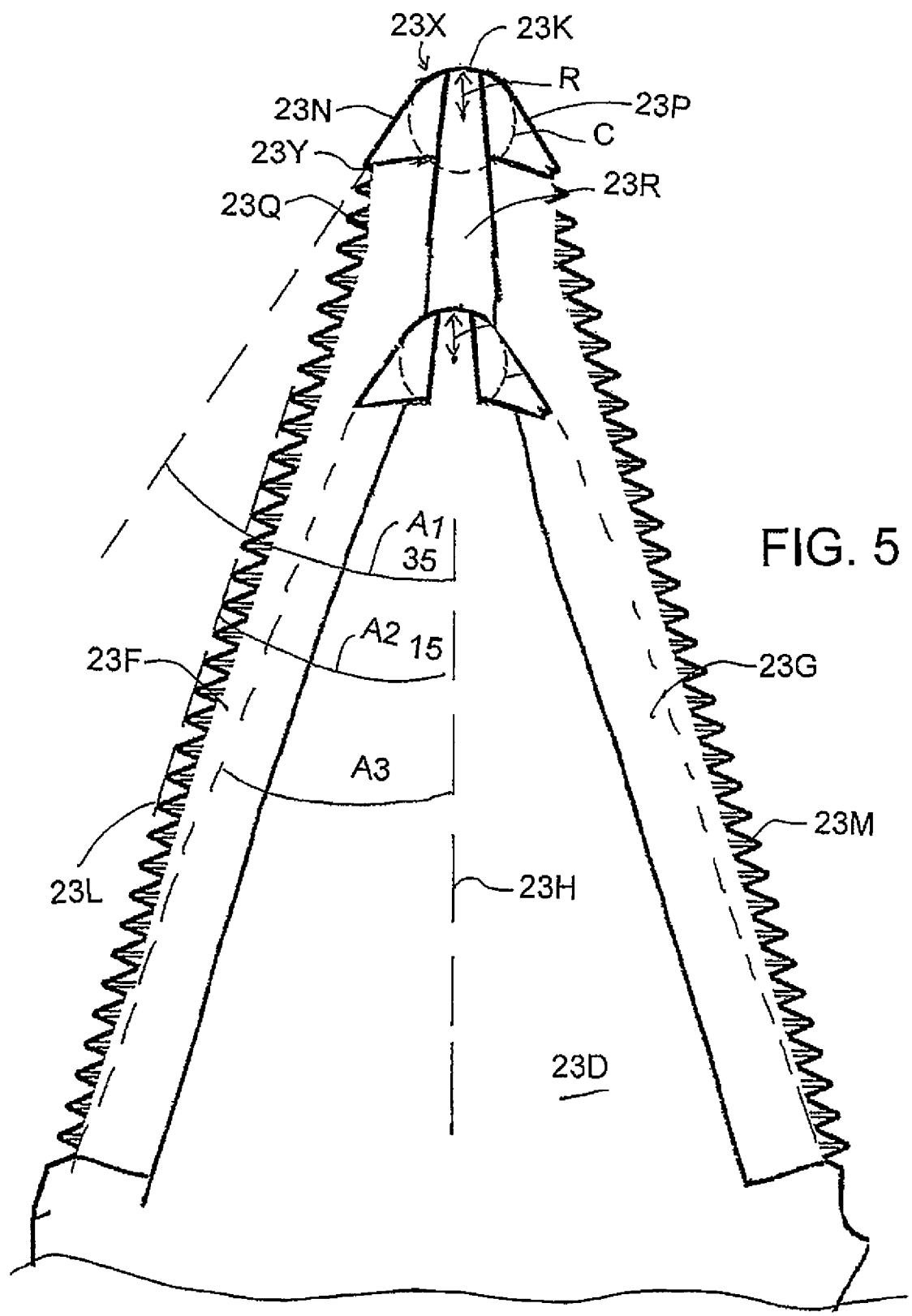
FIG. 5 is top plan view of one knife blade of FIG. 3 on an enlarged scale showing the angles of the side edges for different length blades.

As shown in FIGS. 3, 4 and 5, the arrow head shaped front point portion 23X has side edges 23N, 23P which are not sharpened. The angle of the bevel of the sides 23F and 23G may extend partly into the side edges 23N and 23P but the side edges 23N and 23P are not beveled to the bottom surface 23E so that they are not sharp. Also the last serration 23Y of the bevel edges 23F and 23G is located at the bottom of the portion 23X so that the side edges 23N and 23P are not serrated. The pointed portion 23X has a thickness at the apex 23K equal to that of the blade so that as shown in FIG. 4B, the thickness along the center line remains constant right up to the apex 23K. The arrangement is designed so that the front portion 23X is as thick as possible over its full extent consistent with the requirement to machine the blade to form the beveled and serrated edges 23F, 23G. Thus the beveled side edges 23N and 23P are reduced in width in plan view at as they approach the pointed portion 23X leaving a strip 23R of the upper surface between the beveled edges having thickness equal to that of the blade with side edges 23Q of the strip being parallel to the center line 23H of the blade. Thus, at this strip 23R, the beveled side edges 23N and 23P become narrower as the beveled side edges 23N and 23P approach the front pointed portion 23X of the blade.

The beveled side edges 23N and 23P and the serrations 23L therein terminate at the position 23Y spaced from the apex 23K of the pointed portion 23X such that the front pointed portion 23X forms an arrow-head shape in front of a forwardmost one 23Y of the serrations with the width of the front pointed portion 23X being substantially equal to the width of the side edges 23N and 23P at the forwardmost one 23Y of the serrations.

Figure 6:
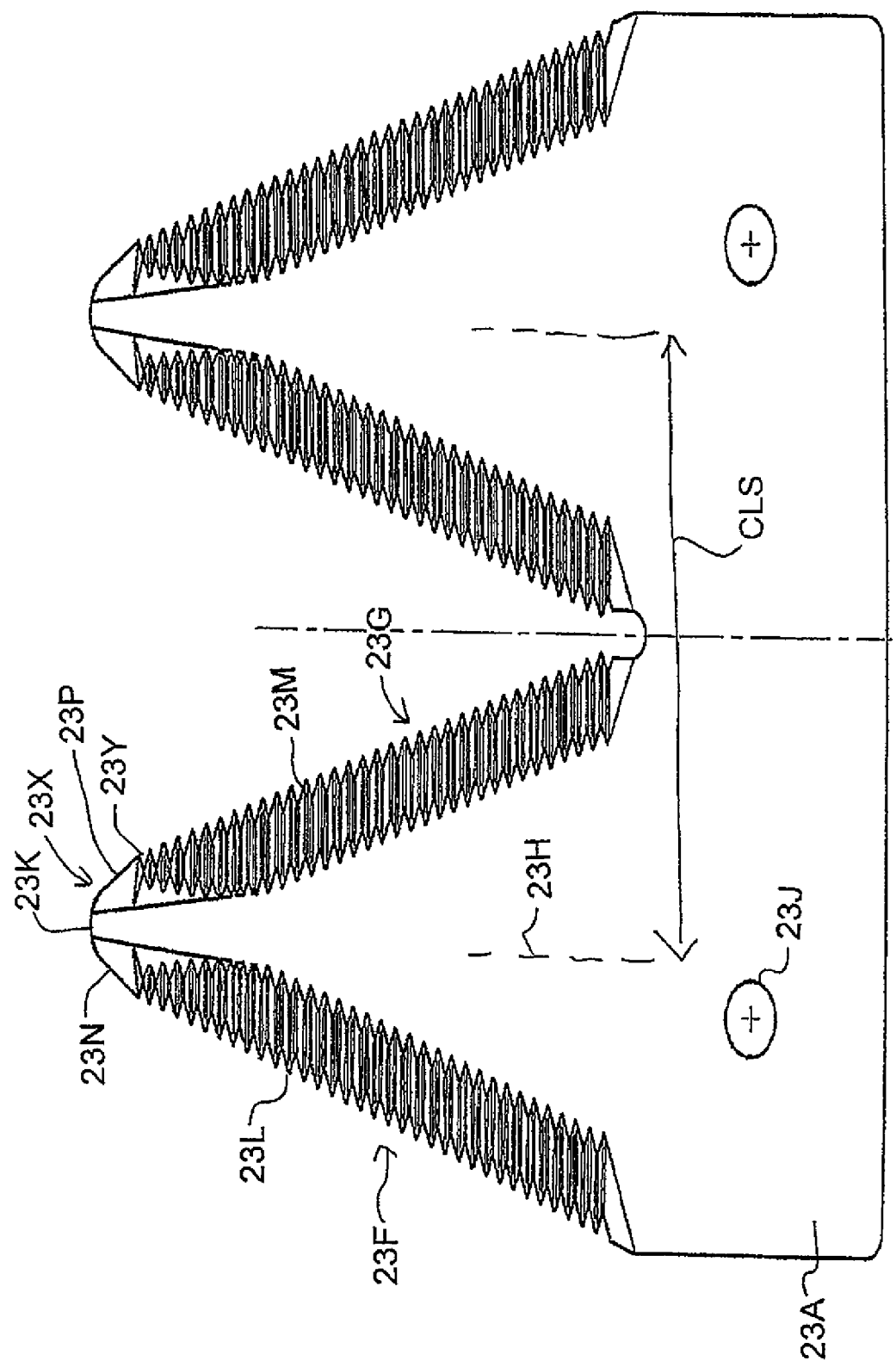
FIG. 6 is top plan view of a knife blade of the type of FIG. 3 showing a different width blade.

As shown in FIGS. 3 and 4, a center line spacing CLS between each knife blade and the next is less than the conventional value of 3.0 inches and preferably of the order of or equal to 2.0 inches. It will be appreciated that a measurement of center to center spacing which is equal to an integral number of inches is preferred for engineering reasons but in theory it is not essential to have an integral number and in some cases the spacing can be in millimeters. In practice, a spacing in the range 2.5 to 1.5 inches is suitable. In FIG. 6 (not to scale) a wider spacing of 2.5 inches is shown. In FIG. 5 the angles of different lengths of blade are shown where a blade having a length of at least 2.5 inches from the trash bar is shown having an angle A2 of the side edges and a shorter blade having a length of the order of 2.0 inches from the rash bar has angles A3. In each case the angles of the side edges 23N and 23P is slightly greater than that of the cutting edges.

As shown in FIGS. 3 and 4, a length L along the center line 23H of each knife blade from the trash bar that is the rearmost end 23T of the cutting edge 23F to the forwardmost tip 23K of the knife blade is substantially equal to or greater than 2.75 inches. Improvement in cutting efficiency is obtained by increasing the length of the blade so that the selection of a value of at least 2.75 inches is preferred which provides the improved cutting action while avoiding a blade which has a length greater than can be manufactured to remain stiff and straight in the cutting action without danger of bending. Improvement can be obtained at any value greater than conventional blades so that any value greater than 2.0 inches is within the invention herein. A length greater than 2.5 inches will provide a significant improvement.

In order to provide shedding of crop at the apex, the radius of curvature of the front pointed portion at the apex is less than 0.5 inch and preferably less than 0.25 inches. However a blunt front edge is possible provided it is sufficiently narrow and a value of less than 0.25 inch or more preferably less than 0.125 inch is possible.

The above geometry provides a construction in which the side edges of the blade are arranged relative to a center line of the blade at an angle less than 30 degrees and preferably less than 25 degrees.

Similarly the side edges of the front portion, which are typically but not necessarily at the same angle as the side edges of the blade, are arranged relative to a center line of the blade at an angle less than 30 degrees and preferably less than 25 degrees. In practice this angle is preferably of the order of 20 degrees.

Thus the preferred construction provides a center line spacing between each knife blade and the next is of the order of or equal to 2.0 inches, the radius of curvature of the front pointed portion at the apex is less than 0.25 inch and the side edges of the front portion are arranged relative to a center line of the blade at an angle of the order of 20 degrees.

As shown in FIG. 1, the width between the centers of the guards is indicated at D. This can be the same as the length of the cutting stroke so that the blades move from a position aligned with the center line of one guard finger to that of the next. However in some embodiments the stroke may be a multiple of the distance D, typically twice, so that the blades move from the first guard finger to the third crossing the second. The reversal of the reciprocating action at the guard center line ensure that the blades are stationary and therefore carrying out no cutting when they are overlying the guard and not at an intermediate location. The increase of the stroke length to a multiple of the finger reduces the number of times the blades are stationary but requires a reduced stroke rate due to the increased forces on the drives system.

This distance D is less than 3.0 inches and is more preferably of the order of 2.0 inches. Typically the stroke can lie in the range 1.5 to 2.5 inches since this provides a stroke length which allows an increase in the cutting reciprocation rate of the sickle bar by a percentage of the order of 22%. This allows a typical rate of 600 cycles per minute, suitable for a 40 ft sickle bar, to be increased a rate greater than 750. For shorter bars this rate can be greater than 900. The length of the stroke and the rate are determined by the selected geometry of the drive system.

Typically each of the knife blades 23, as shown in FIG. 2, is generally triangular in shape. In the example shown, the blade 23 forms a double blade connected by a base 23A. The base has holes 23J for mounting on the blade drive bar 24. The blade 23 has two side edges 23F, 23G which converge at an angle A to the direction of reciprocating movement. At the front of the blade is provided a front apex 23K of a front arrow head shaped portion 23X.

The blade has a bottom cutting surface 23E for passing across the ledger surface 15A of the bottom knife guards 15 and an opposed or upper surface 23D. The two converging side cutting edges 23F, 23G are beveled from the upper surface 23D to the bottom cutting surface 23E to cooperate with the shearing edges of the knife guards. In addition the beveled side edges 23F, 23G are typically serrated with grooves 23L, 23M running in a direction longitudinal to the reciprocating direction. In order to maximize the cutting action, the length of the cutting edge is substantially the maximum length extending from the trash bar 28 or the rear edge 23T at the rear to a position at the front edge or tip 23K of the blade.

The fore-aft length of a blade has traditionally been in the order of 1.75 inches from the front of the trash bar to the tip of the section, or 2.2 inches from the front edge of the knife back to the tip of the section.

In this new arrangement, the fore-aft length L of the blade is increased substantially. Thus the length of the cutting edges of each sickle blade or blade is greater than 2.2 inches. This can be as much as 2.6 inches and can lie in the range 2.2 to 3.0 inches.

This also reduces the angle A of inward inclination of the cutting edge from the typical 30 degrees relative to the center line (an equilateral triangle) to an angle less than 30 degrees and typically of the order of 15 degrees and in the range 15 to 30 degrees.

It is common practice for sickle blades to have the front edge as a transverse straight edge in the order of 0.6 inches wide. The wide tip has the potential for running down crop, thus leaving long uncut stems. In the present invention the blade is designed with a pointed tip or front apex 23K, thus eliminating the problem.

The intention is therefore to provide a sickle blade which is as pointed at the front apex 23K as reasonably practical. A sharp point is difficult to obtain so that typically the front apex 23K is smoothly curved with a radius of curvature R of a curvature circle C less than 0.5 inches thus defining the front apex 23K which is sufficiently narrow to shed crop stalks to each side.

Each knife blade therefore has a front point portion in front of the cutting edges which has side edges 23N, 23P converging to front apex where the apex and the side edges are shaped and arranged such that crop material engaging the point portion as the point portion is moved forwardly in the crop is shed to one or other side of the point portion for cutting and is not pushed forwardly by the point portion.

While this is the optimum arrangement, a practical construction may have a transverse width of a straight line across the apex 23K which is much less than the conventional 0.7 inches and is typically less than 0.25 inches. This narrow front edge is selected to be sufficiently narrow so that crop is shed to either side and not pushed forwardly as the blade moves forwardly.

The side edges 23N and 23P are inclined outwardly and away from the apex at an angle A1 relative to the center line 23H of the order of 35 degrees and certainly less than 45 degrees to the center line 23H.

The characteristics of the blade defined above where it is much narrower than conventional and significantly longer places limitations on the shape and arrangement of the beveled and serrated edges 23F, 23G.

Thus the beveled edges 23F, 23G are reduced in width at 23Q as they approach the front edge pointed portion 23K at the apex 23X leaving a strip 23R of the upper surface between the beveled edges with parallel side edges of the strip 23R. Thus at this strip 23R the beveled edge 23F, 23G becomes narrower and the grooves 23L, 23M in the edge get shorter as the beveled edge approaches the front pointed portion 23X of the blade. The beveled edges 23F, 23G and the grooves 23L, 23M therein terminate at a position spaced from the front apex 23K to define the arrow head shaped portion 23X in front of the beveled edges which imparts sufficient strength to the construction to allow the formation of the serrations.

The cutting efficiency and therefore stubble length are also affected by the width of the cutting edge 15B, 15C of the ledger surface 15A of the knife guard 15. Generally, the width W1 between the edges 15B and 15C at the rear of the cutting edge on the guard in the arrangement of the present invention is substantially increased from the conventional width of the order of 1.0 inches. Thus the width W1 of each guard at a position thereon aligned with the rear end of the cutting edge of each blade is greater than 1.0 inches. The maximum width with a blade of 2.0 inches in width is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard has a width which is between 0.5 and 0.1 inches less than the width of the blade. The bottom guard also tapers so that its edges 15B and 15C lie closely adjacent the edges of the blade when the blade and guard are in the aligned position at the end of a stroke. Thus the angle of convergence of the edges 15A and 15B matches closely the angle A. This leaves a space S at the rear of the guards 15 at the trash bar 28 to avoid pinching crop at this location. This space S generally should be greater than 0.4 inches and typically is of the order of 0.5 inches.

Thus the cutting system is carried so that it moves across the ground either closely in contact with the ground as shown or at a set cutting height. In both cases this determines a cutting height or nominal cutting distance from the ground with is the length of any crop stalk if cut efficiently and directly as it reaches the location between the blade and ledger surface. In FIG. 2, the cutter bar rests on the ground at a skid plate 80 which holds the ledger surface 15A at the height ND from the ground. Typically this is of the order of 1.5 inches but this can be varied slightly by changing the angle of the cutter bar about a transverse axis by changing the angle of the header.

Figure 7:
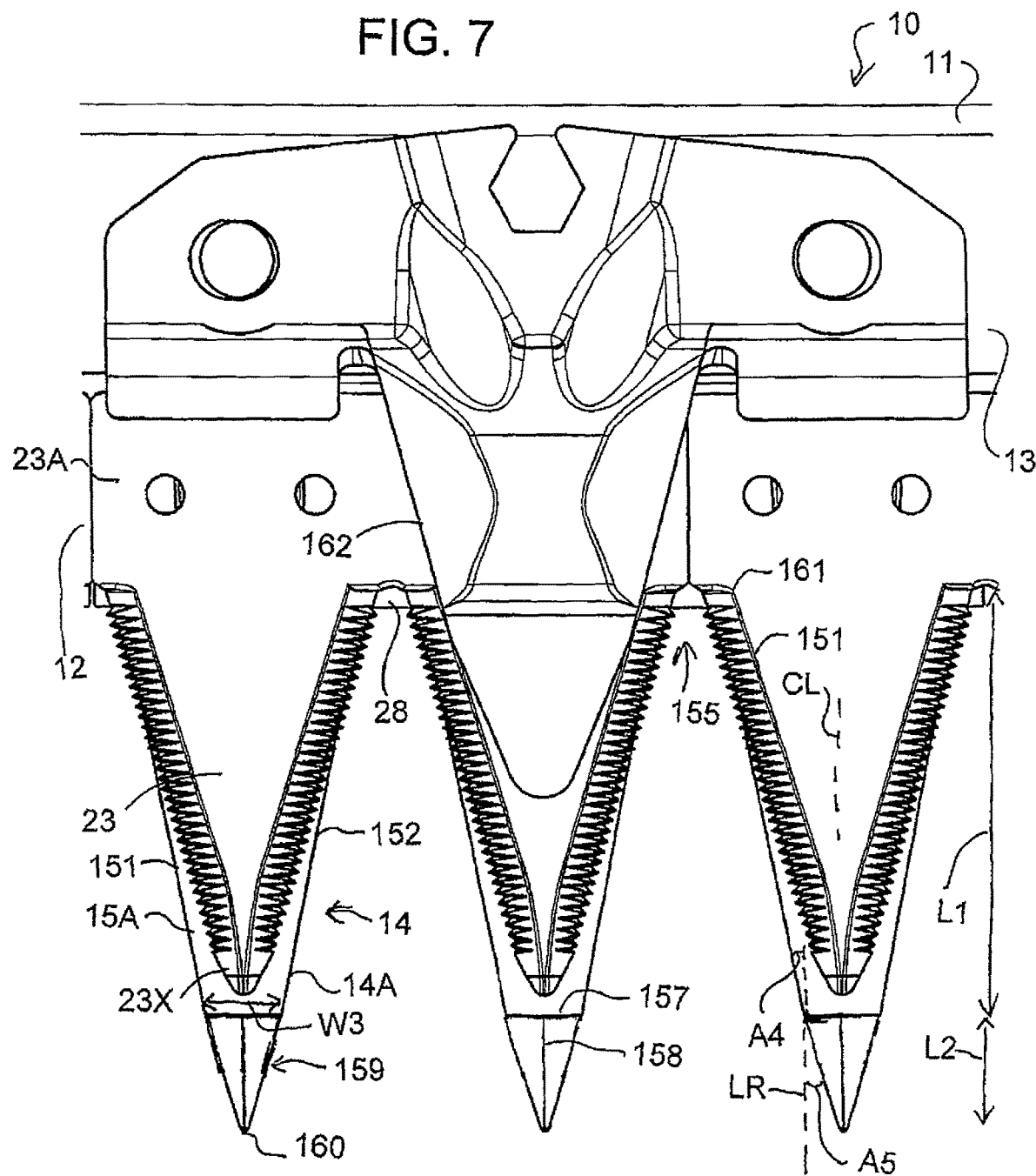
FIG. 7 is a top plan view of a part of header showing a blade of a sickle knife according to a second embodiment of the present invention using a pointed guard.
Figure 8:
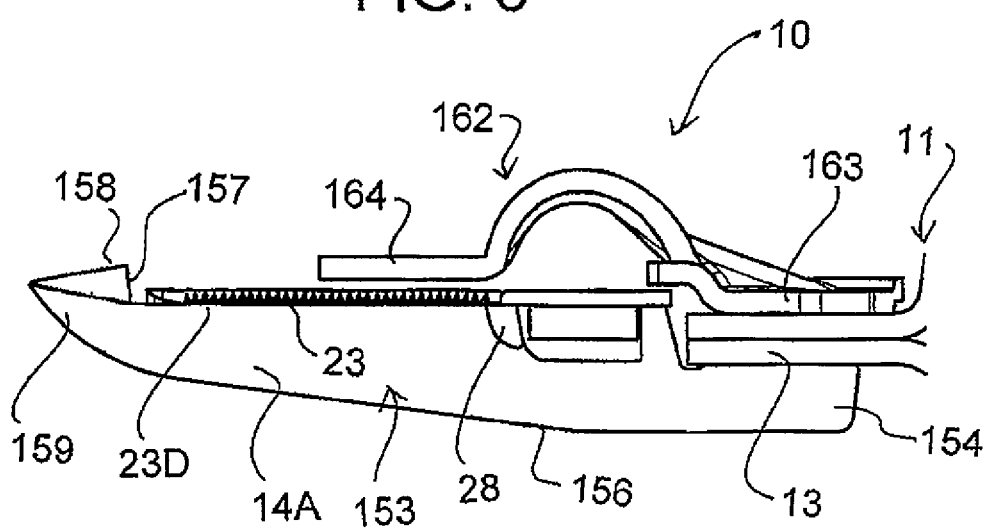
FIG. 8 is a cross-sectional view along the lines 8-8 of FIG. 7.

Turning now to FIGS. 7 and 8, the shape of the pointed guard for use in the present invention in conjunction with the pointed blade is shown and described in more detail as follows.

The knife guard 30 for use in a sickle cutting apparatus 10 includes the frame structure 11, guard bar 13, sickle bar 24 and knife blades 23 as previously described. Each the knife blades 23 has a cutting surface 23D for passing across the ledger surface 15A of the knife guards 151. Each of the knife blades has on first and second sides first and second side cutting edges as previously described to cooperate with shearing edges 152 of the guard guards 151.

The knife guard 151 includes a base portion 154 for mounting on the cutter bar 13, a rear trash bar 28 in front of the base portion 154 and at least one guard finger 153. In this embodiment three fingers 153 are arranged in a row, where the finger or fingers 153 are mounted on the base portion 154 so that the fingers are arranged in a row along the cutter bar with a space 155 between each finger and the next allowing crop to enter the space up to a position of engagement with the rear trash bar 28.

The guard fingers have the upwardly facing ledger surface 15A with opposed side edges arranged to provide first and second shearing edges. The guard fingers have a downwardly facing ground engaging surface 156 shaped and arranged to provide protection for stone engagement as the fingers slide over the ground. That is each finger has sufficient strength to avoid breakage when impacting stones and obstacles causing the cutter bar to rise if the impact is sufficient and extends over sufficient number of guard fingers to provide the lifting action. This shape of the ground engaging surface is well known to persons skilled in the art and includes a longitudinal rib which is generally triangular in cross-section on the underside of the upper part containing the ledger surface. The base of the rib thus forms an apex which runs over the ground to prevent upward forces from snapping the guard finger at the ledger surface.

An upstanding transverse shoulder 157 is provided at a front edge of the ledger surface 15A and extends upwardly to a top surface 158 of the finger where the shoulder terminates. Thus there is no tang of conventional shape, that is no portion of the guard extending rearwardly over the ledger surface 15A from the shoulder 158. Above the ledge surface therefore the knife blades are free from confinement by a conventional tang as used in a conventional pointed guard or by a cooperating upper guard finger of the type used in a stub guard as described above.

A tip portion 159 in front of the ledger surface extends forwardly from the shoulder 158 and defines a forwardmost generally pointed tip 160 for engaging crop in front of the ledger surface 15A.

A length L1 of the ledger surface 15A from the trash bar 28 to the shoulder 157 is greater than 2.0 inches or more preferably greater than 2.5 inches; and a length L2 of the tip portion 159 from the shoulder to the tip is less than 1.0 inch or more preferably less than or equal to 0.75 inches.

As defined previously, a center line spacing between each knife guard finger and the next is less than 3.0 inches and preferably of the order of 2.0 inches.

As defined previously, a width of each guard finger at the rear trash bar is greater than 1.0 inches and more preferably is greater than 1.5 inches or equal to the maximum width which can be obtained while leaving a space at the trash bar between the ledger surfaces in the range 0.25 to 0.5 inch or the distance necessary to avoid pinching of crop stalks between the ledger surfaces.

The side edges of the ledger surface 15A converge from the trash bar 28 to the shoulder 15 at an angle A4 greater than 10 degrees and preferably of the order of 12 degrees to a line LR at right angles to the trash bar or parallel to the center line CL. The angle A5 of the side edges at the shoulder increases so that the tip portion is shorter than would be the case if the angle A4 were continued up to the tip. However overall, it will be appreciated that a line joining the rear end 161 of the side edge 151 of the ledger surface 15A and the tip 160 converges at an angle greater than the 10 degrees of the side edge to a line at right angles to the trash bar.

As the side edges converge at a relatively rapid angle from the base to the tip, the ledger surface has a width W3 at the shoulder 157 of less than 0.75 inches and preferably of the order of 0.5 inches.

There is also provided a plurality of separate hold down members 162 arranged to engage the blades at every third spaced ones of the fingers. This has a base portion 163 mounted on the cutter bar 13 and a finger portion 164 extending over the ledger surface of one of the fingers 14A.

Generally the cutting speed can be increased as the speed of the sickle is increased. One limitation for the sickle speed is the stress that is induced in the sickle drive and the knife back from the inertia loads resulting from the acceleration of the sickle at the start of the stroke. These acceleration loads are proportional to the stroke length and to the square of the sickle speed.

Therefore for the same acceleration loads, if the stroke is decreased, the speed can be increased by an amount represented by the following formula:

$$stroke2 = stroke1 \times rpm1^{\wedge}2/rpm2^{\wedge}2$$

or in terms or speed:

$$rpm2 = (stroke1 \times rpm1^{\wedge}2/stroke2)^{\wedge}0.5$$

For example for a typical 35 ft header and a single sickle knife driven from one side, to achieve the same loads, if a sickle with a 3 inch stroke, is run at 750 rpm, a sickle with a 2 inch stroke can be run at 918 rpm for the same inertia loads.

This distance of the cutting stroke is less than 3.0 inches and is more preferably of the order of 2.0 inches. Typically the stroke can lie in the range 1.5 to 2.5 inches since this provides a stroke length which allows an increase in the cutting reciprocation rate of the sickle bar. This rate is preferably greater than 900. A range of 900 to 1200 rpm is particularly suitable depending on the length of the sickle.

Thus, the maximum sickle speed is affected by the length of the sickle assembly. Generally headers vary in width from 15 ft to 45 ft and are generally available in single knife drive for widths up to 40 ft. Therefore the length of the sickle can vary in length from 7.5 ft to 40 ft.

Where the maximum speed for a 40 ft single knife drive (SK) header with a 3.0 inch stroke might be set at 600 rpm, the maximum speed for 15 ft double knife drive (DK) header might be set at 950 rpm.

Therefore in the case of a 2 inch cutting stroke, the cutting speed of the new system will be increased by a percentage (22.4%) over the current system.

Depending on the length of the sickle, for same inertia loads, the sickle speed can be increased as shown in Table 23:

It has been found with the current cutting system, that the increasing the knife speed beyond a speed of about 950 rpm (1900 strokes per minute) produces little improvement in cutting performance. It is suspected that this is due to the blunt face of the traditional knife blade or sickle section essentially creating a wall that prevents crop from entering the cutting area.

Figure 2A:
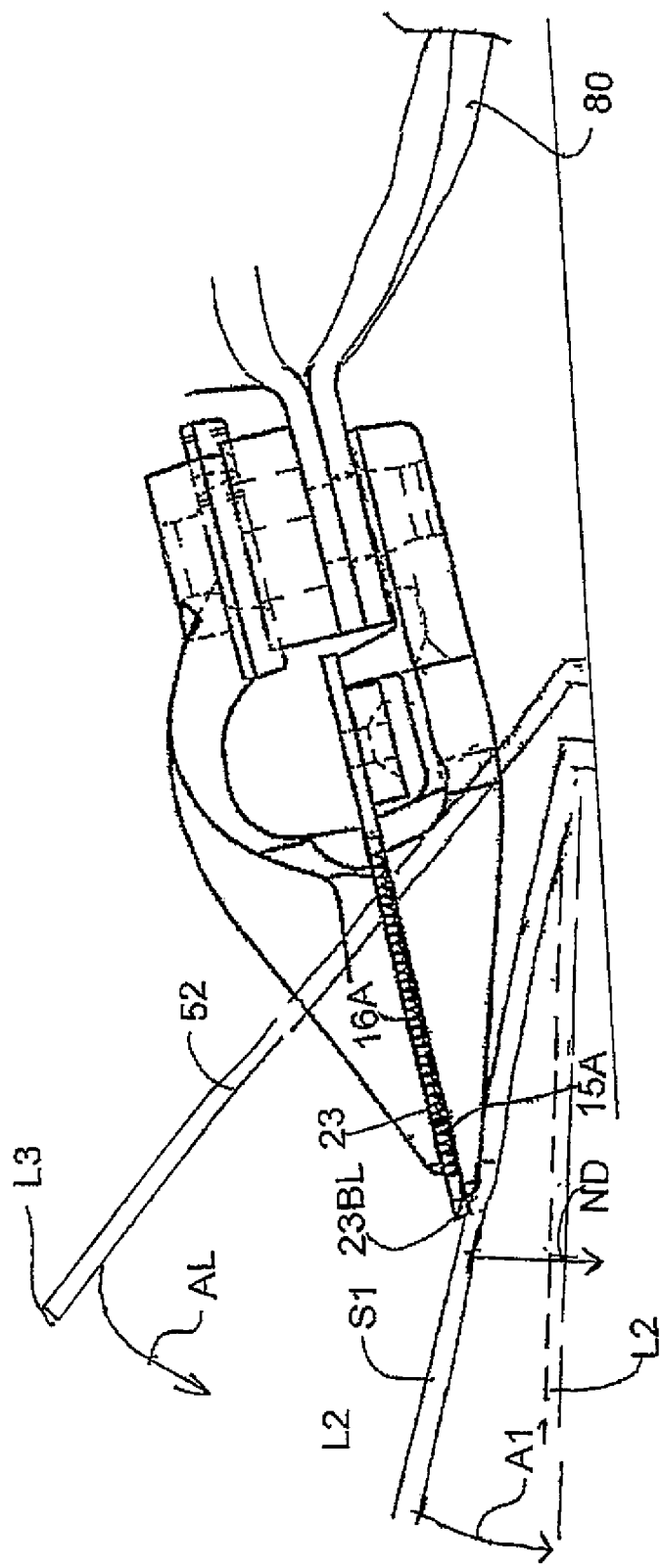
FIG. 2A is a side elevational view of a sickle apparatus showing the engagement of the front edge of the knife and the engagement of the trash bar with the crop which leads to cutting inefficiencies leading to maximum stubble length increases.

Turning now to the cutting efficiency obtained by the above geometry of cutting system relative to prior art arrangements shown in FIGS. 9 to 13, a generic cutting system is shown in FIG. 2A to show how cutting inefficiency and the associated increase in maximum stubble length arises.

Thus in FIG. 2A, the cutting system is carried so that it moves across the ground either closely in contact with the ground as shown or at a set cutting height. In both cases this determines a cutting height or nominal cutting distance ND from the ground with is the length of any crop stalk if cut efficiently and directly as it reaches the location between the blade and ledger surface. In FIG. 2A, the cutter bar rests on the ground at a skid plate 80 which holds the ledger surface 15A at the height ND from the ground. Typically this is of the order of 1.5 inches but this can be varied slightly by changing the angle of the cutter bar about a transverse axis by changing the angle of the header.

Cutting inefficiency arises where stalk S1 engages a blunt front edge 23BL of the knife blade 23 so that it is pushed forwardly by the knife blade rather than reaching the side edges of the knife blade where it can be cut.

In conventional thinking it is understood that this effect is of little importance in that the knife blade is moving rapidly side to side with the expectation that the sideways movement will immediately cause any such crop to be shed to the side away from the movement allowing it to be quickly cut.

However the analysis of the cutting system shows that, at high ground speed, the forward movement has much more effect on the crop than the sideways movement so that a band remains in contact with the blunt front edge L. This crop is then pushed forward forwardly and downwards without cutting until the crop is shed from the blade at the location where the blade reverses at the next guard finger, or at some point prior to that location, so that the crop can then enter into the shearing action on the second side of the blade.

Another analysis shows that, in each cycle of cutting crop, the side of the blade which is not cutting will allow some stalks to move to a position between and the guard as the blade moves away from the guard sufficiently that the blade reaches a position in which the stalks engage the trash bar. Again therefore these stalks are pushed forwardly and downwards by the trash bar without cutting until the blade comes back in the reverse direction to effect the shearing action of the crop of that second side of the guard.

It is known that sideways movement of the crop also occurs during cutting. That is each stalk is carried sideways by the moving blade into the shearing action with the guard finger. This amount of movement varies depending on the timing of the stalk entering the area to be cut and engaging the blade and the side to side position of the stalk as it enters the area. The amount of sideways movement will of course increase the length of the stalk as it is cut since the position of the cut is at a height of the stalk greater than the distance ND from the ground. The analysis herein does not take into account this sideways movement since the maximum stalk length which can be obtained by the sideways movement is always less than the maximum stalk length which is obtained by the above described forward movement.

However another benefit of the wider guard fingers is that the crop moves to the side by a shorter distance before encountering the shearing action at the side edge of the guard.

It will be appreciated therefore that some stalks provide stubble length of ND because they are cut without any forward pushing movement and some stalks are pushed forward to a length L2 or L3 where the actual stubble length is equal to the hypotenuse of the distance of forward movement before cutting occurs and distance ND.

As shown as an example in FIG. 12A, the guard fingers 15, knife blades 23 and the trash bar 28 are arranged so as to provide a cutting action on the crop in which in a first cutting stroke, each knife blade 23 moves across from one guard finger 151 to the next 152 in a first direction 231 so as to cut crop located on said first side of the knife blade 23 between the first cutting edge of the knife blade and the side 15C of the next guard finger 152 by the shearing action while leaving uncut crop located on the second side of the knife blade. In a second cutting stroke, each knife blade moves across from the next guard finger 152 to said one guard finger 151 in a second direction opposite to direction 231 so as to cut crop located on the second side of the knife blade between the second cutting edge of the knife blade and the guard finger 151 by the shearing action. The cutting action includes the previously uncut crop located on the first side of the blade 23, while leaving uncut crop located on the second side of the knife blade.

Figure 9:
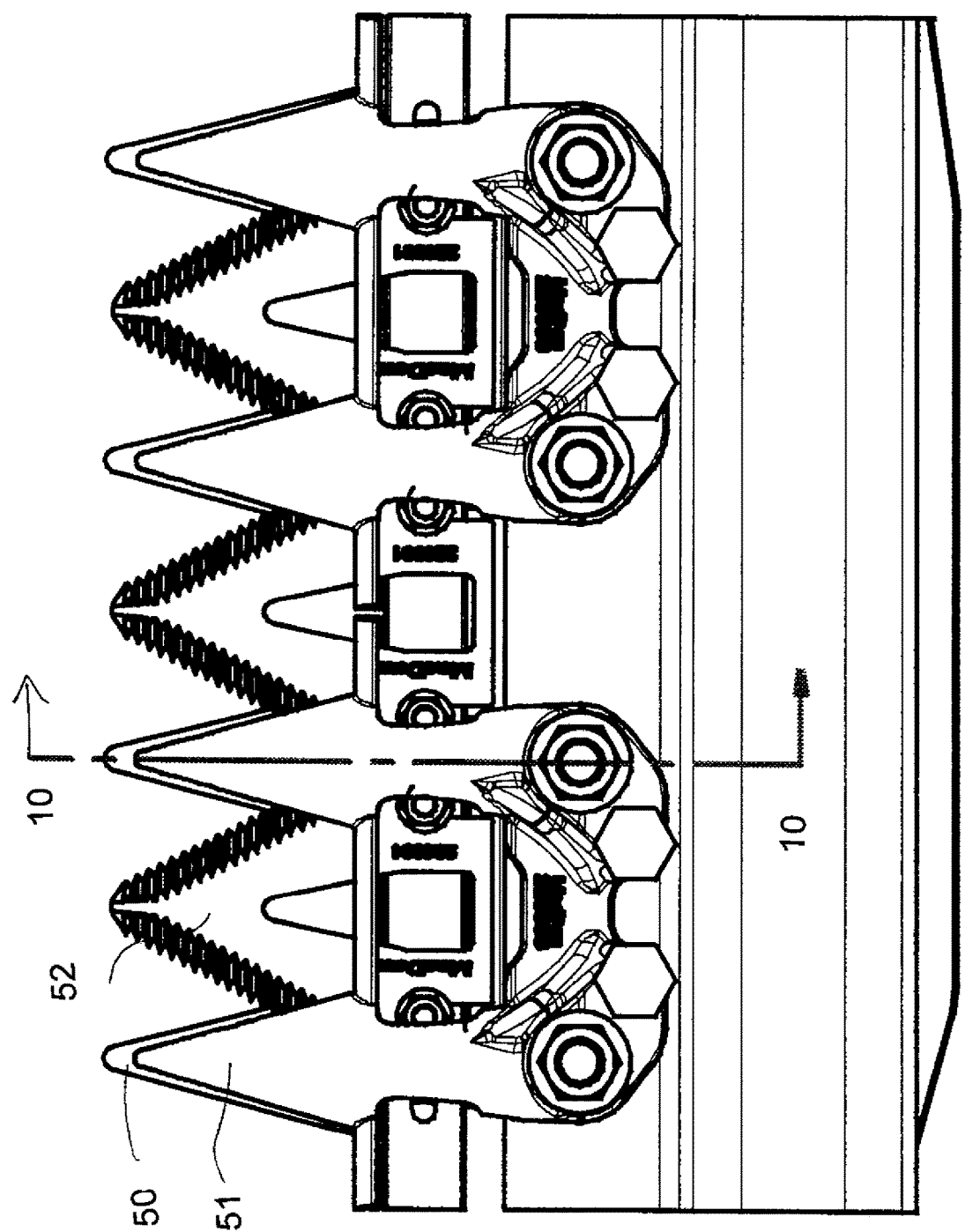
FIG. 9 is top plan view of another embodiment of cutting system using a 3 inch spacing of the blades and using stub guards.
Figure 11:
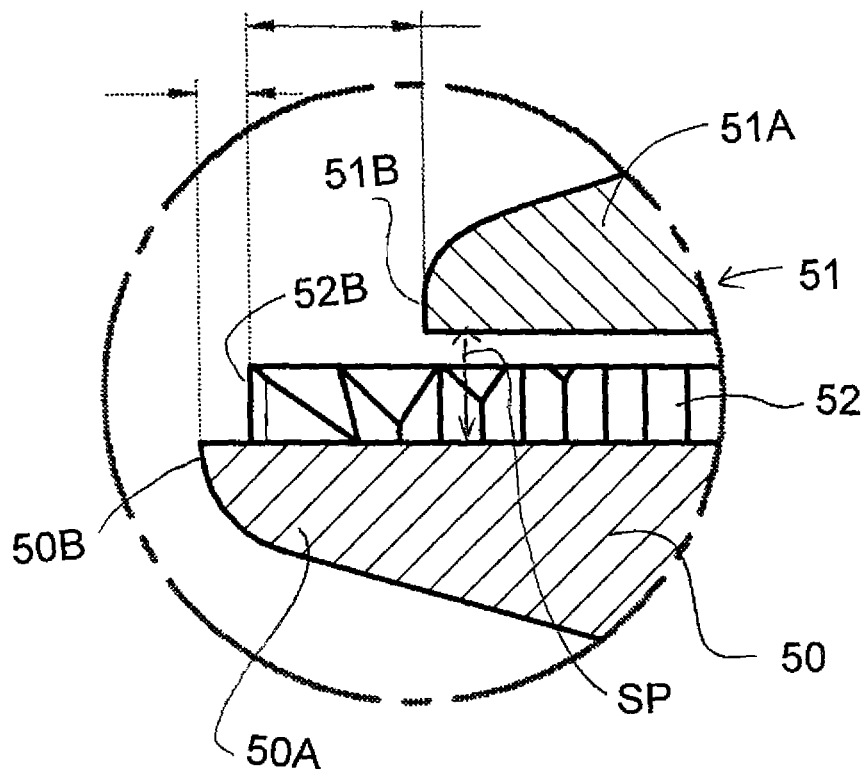
FIG. 11 is a detail of the cross-sectional view of FIG. 10 showing the tips of the bottom guard finger, blade and hold down finger.
Figure 10:
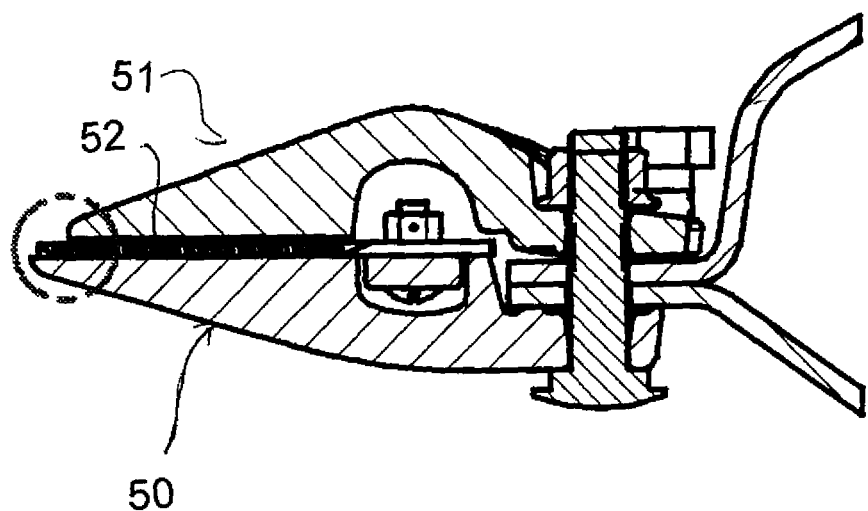
FIG. 10 is a cross sectional view along the lines 10-10 of FIG. 9.

Turning now to FIGS. 9, 10 and 11 there is shown a stub guard system similar to that previously described and shown in FIGS. 1 and 2 and including many of the features previously defined above. In this embodiment, however the system is a 3 inch system so that the tip to tip spacing of the blades and guards is 3 inches and the stroke of the sickle knife drive is also 3 inches so that the blades reciprocate back and forth between a first points aligned with one guard to a point aligned with the next. Thus as shown in the stub guard system of these figures there is provided a bottom guard 50, a top hold down 51 and a set of blades 52 carried on the reciprocating sickle bar.

In this embodiment the shape and arrangement of these components is substantially as previously described except that each guard element has only two fingers so that the pair of fingers of the bottom guard underlie the pair of fingers of the top hold down.

The pair of fingers of the top hold down are individually adjustable so as to change the spacing SP between the finger 51A and the ledger surface of the guard finger 50A using the construction as shown and described in U.S. Pat. No. 9,622,405 (Talbot) assigned to the present applicant and issued Apr. 18, 2017.

As best shown in FIGS. 10 and 11, the guard fingers 50A and blades 52 have lengths from the cutter bar arranged such that a forwardmost tip 50B of the guard finger 59A is forward of the tip 52B of the blade 52 and a forwardmost tip 51B of the hold down finger 51A is rearward of the tip 52B of the blade 52.

Preferably the tip of the guard finger is longer than the tip of the blade by a distance up to 6.0 mm and preferably of the order of 3.0 mm.

Preferably the tip of the hold down finger is shorter than the tip of the blade by a distance in the range 1.5 to 10.5 mm and preferably of the order of 5.0 mm.

That is the fingers form a conventional stub guard where there is no component of the lower stub guard finger which is above the ledger surface. However in this arrangement the tip 50B is located just in front of the tip of the blade rather than behind the tip of the blade as would be conventional. It has been found that this arrangement allows the clearing of the blade tip in tough cutting conditions as does a normal stub guard system but in addition the slightly longer finger cooperates with the pointed blade system described in detail herein where there is an additional point portion in front of the conventional beveled side cutting edges of the blade. This may improve the cutting action and may protect the point against damage while still allowing the clearing action of the crop from the front of the guards and blade which is obtained using a stub guard system.

Turning now to FIGS. 12 to 15 there is shown a pointed guard system similar to that previously described and shown in FIGS. 7 and 8 above.

Figure 12:
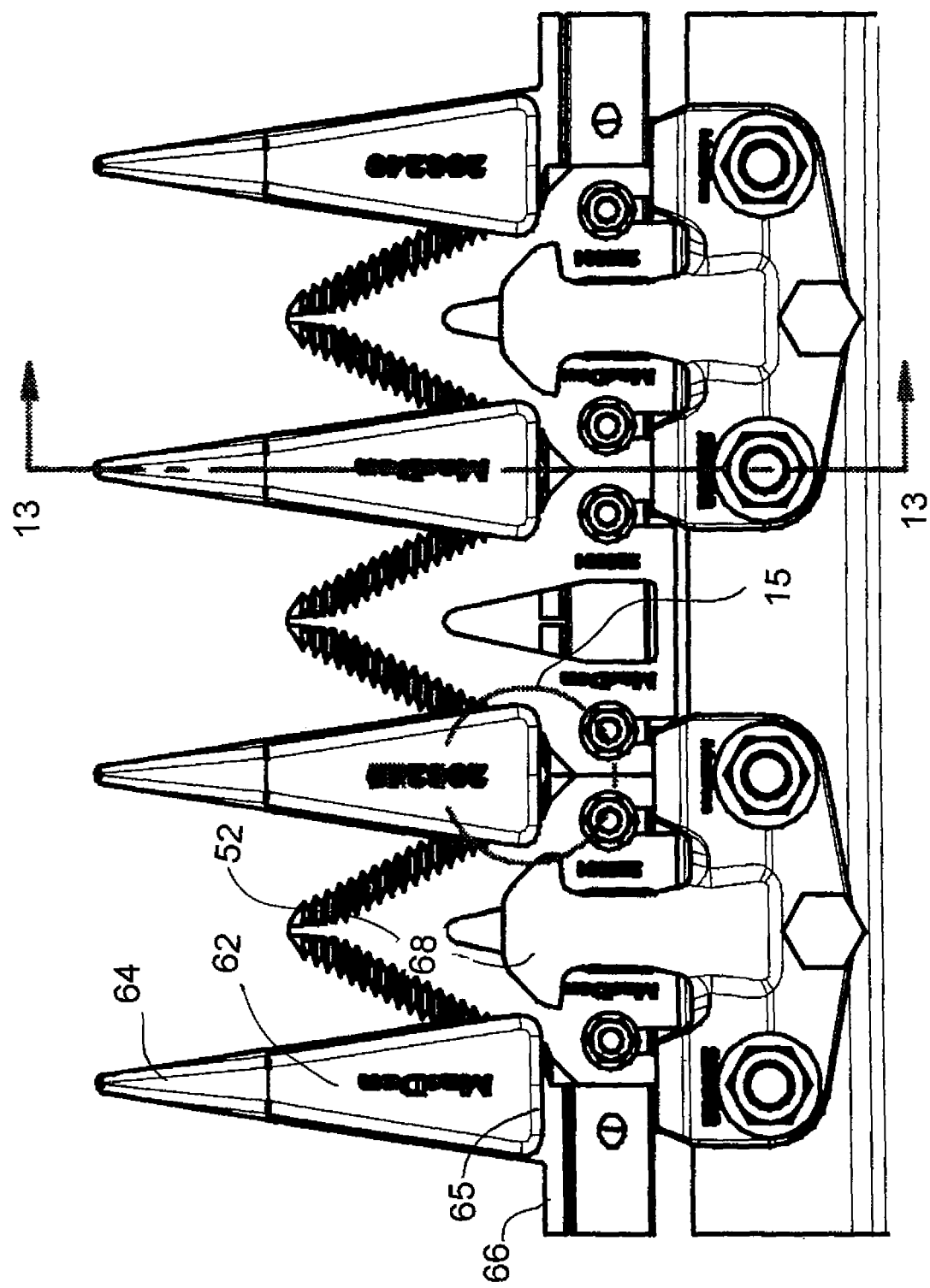
FIG. 12 is top plan view of another embodiment of cutting system using a 3 inch spacing of the blades and using pointed guards.

In this arrangement however the pointed guard arrangement 60 includes a tang portion 62 overlying the ledger surface 61 so that the blade 52 passes through a slot 63 defined between the underside 65 of the tang portion and the ledger surface. The tang portion is connected to the tang portion in front of the slot by a pointed portion 64 of the pointed guard which converges to a front tip in front of the forward tip of the blade. The tang portion 62 extends rearwardly over the ledger surface from the point portion 64 to a rear edge 65 of the tang portion. As shown in FIG. 12, the rear edge 65 is aligned with a trash bar 66 of the guard which extends outwardly to each side of the ledger surface. As described above therefore the trash bar 66 forms or defines a transverse line across the ledger surface which constitutes the line of the rearmost cutting action of the blade on the ledger surface. This line is coincident with the rear edge of the sharpened cutting edge of the blade.

As shown in FIG. 12, the width of the tang portion at the rear edge 65 is equal to the width of the ledger surface of the guard at this point which is greater than 1.2 inches and more preferably of the order of 1.5 inches. This wider width of the guard and tang portion than is conventional in systems of this type provides an improved cutting action with the blade as described in more detail above. This wider width of the tang portion also operates to provide improved control over the blade as it reciprocates through the slot. Even though the blade is contacted by a hold down finger 68 between the guards, there is a tendency for it to rise so that the increased width of the tang portion ensures that it is properly guided into the slot as it approaches the slot from one side. Thus a width WT of the tang portion across the guard finger at the rear end of the tang portion is greater than 1.2 inches and more preferably 1.5 inches.

Figure 15:
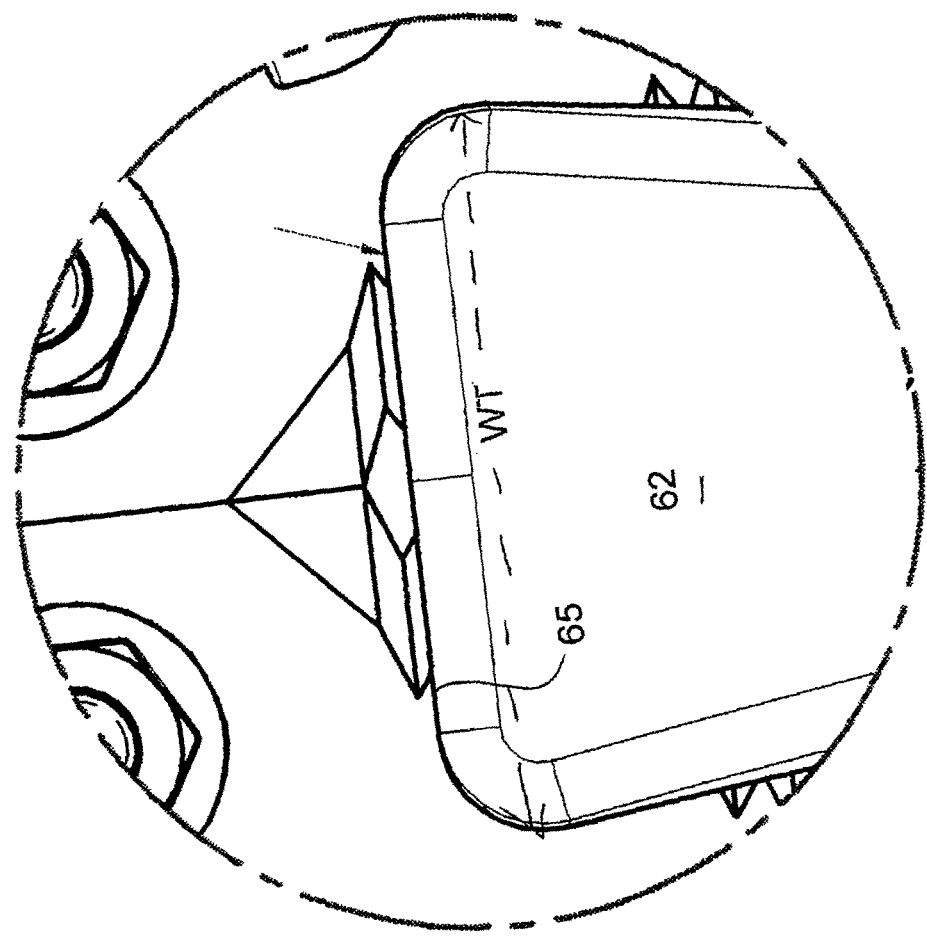
FIG. 15 is a detail 15 of the plan view of FIG. 12 showing the shape of the tang portion.
Figure 14:
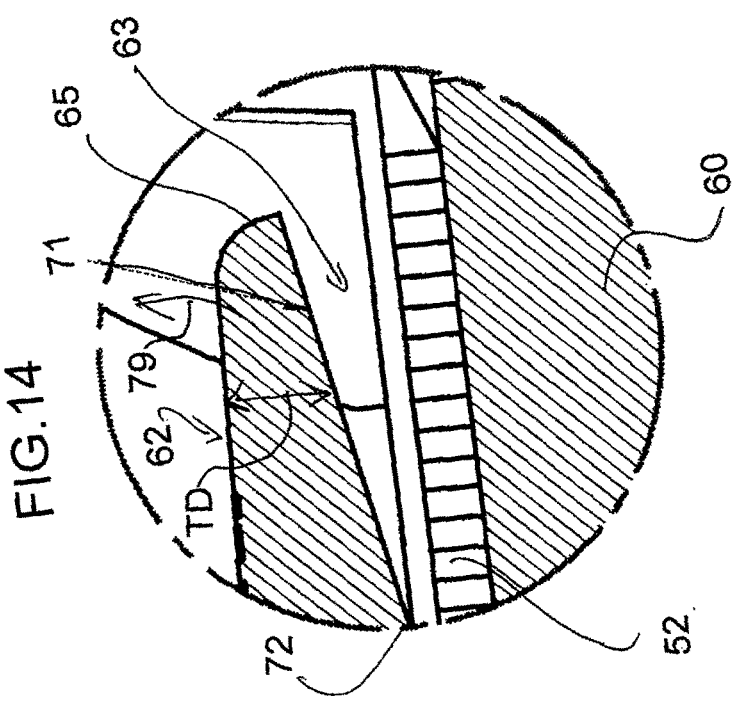
FIG. 14 is a detail 14 of the cross-sectional view of FIG. 13 showing the shape of the tang portion.

As best shown in FIG. 15, the lower surface 69 of the tang portion includes a first portion 70 extending along the slot from the front of the blade to a junction point 72 where the first portion joins a second portion 71. The lower surface of the tang portion thus includes a first portion adjacent the tip portion which is generally parallel to the ledger surface and a second portion adjacent the rear edge which is inclined at an angle away from the ledger surface. The first portion is planar and parallel to the plane of the ledger surface. The second portion is also planar and is inclined upwardly away from the ledger surface from a transverse line at the junction 72 up to the rear tip 65. This shape of the slot surface of the underside of the tang portion provides effective control of the blade movement across the ledger surface while also allowing the guard to be disconnected from the mounting bolts and tilted about the line at the junction 72 to lift the tip upwardly and to lower the rear edge downwardly to allow the guard to be pulled out forwardly with the blade and sickle bar 76 in place. This allows the rear of the guard to clear the sickle bar to move forwardly away from the cutter bar 77.

In one arrangement, the second portion of the tang portion at the inclined angle is obtained by bending the tang upwardly at the junction line 72 relative to the first portion. This bending action occurs at the arrow 79 and results in a situation where both the upper and lower surfaces are inclined cause by the bending of the material forming the tang portion.

As an alternative, the second portion of the tang portion tapers in depth TD from the lower surface to an upper surface thereof toward the rear edge 65 thereof.

As shown in FIG. 13, a length along the tang portion of second portion 72 from the rear edge 65 to the first portion at the junction 72 is shorter that a length of the first portion 70 to the tip portion 64. Thus the main body of the slot is parallel to properly guide the blade and only a relatively short part of the slot is inclined upwardly.

Figure 16:
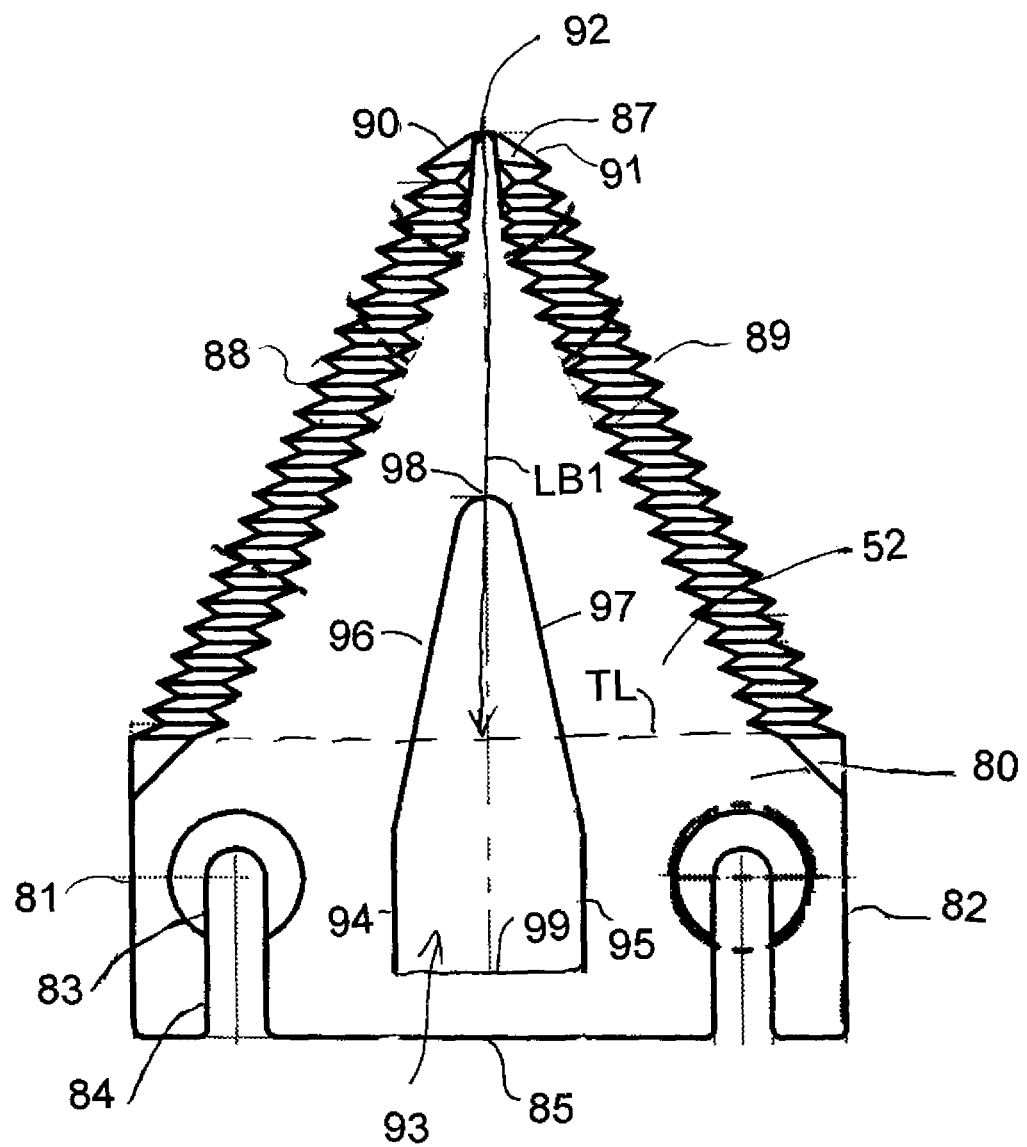
FIG. 16 is a top plan view of blade of the embodiments of FIGS. 9 and 12.

Turning now to FIG. 16, there is shown a blade 52 for use with the systems of FIGS. 9 and 12. It will be noted that the blade member which has a base portion 80 to attach to the sickle bar 76 forms a single blade and not a double blade arrangement as shown and described previously herein. Each blade is therefore a separate component from each of the other blades with two side edges 81, 82 so that the side edges of each blade lie immediately adjacent the side edges of the next adjacent blades when fastened to the sickle bar 76.

The base portion 80 has two countersunk holes 83 connected to slots 84 which communicate with the rear edge 85 of the mounting portion. This allows the blade to be pulled from the sickle bar 76 simply by loosening mounting bolts 86 (FIG. 13) sufficiently to allow the bolts to slide along the slots. This arrangement is described in more detail in U.S. Pat. No. 8,893,462 (Talbot) issued Nov. 25, 2014 and assigned to the present applicant, the disclosure of which is incorporated herein by reference.

Each knife blade has a front point portion 87 in front of the side cutting edges 88, 89 which front point portion has side edges 90, 91 converging to a front apex 92. This construction is substantially as previously described with the exception that the wider blade of 3 inches rather than the previous shown 2 inches provides a shorter and less pronounced point portion. However the point portion has the same construction relative to the beveled and serrated side edges as previously described. Also as shown in FIG. 16, a length LB1 of each knife blade from the transverse line TL to the forwardmost tip 92 of the knife blade is greater than 2.2 inches and preferably greater than 2.5 inches. As described before, the transverse line TL coincides with or is defined by the front of the trash bar and the rear of the beveled edges which form the rearmost line of cutting action of the blade on the guard ledger surface.

Also as shown in FIG. 16, each blade has a cut out opening 93 through the blade extending from a rear edge 99 of the opening adjacent to but spaced from a rear edge 85 of the blade toward the tip of the blade. The cut out opening 93 has a rear edge 99 parallel to a rear edge 85 of the blade, two side edges 94, 95 substantially parallel at right angles to the rear edge 99 and two converging edges 96, 97 extending from the side edges to a forward apex 98. This shape takes out an amount of the material of the blade which ensures that the blade has approximately the same weight as a conventional 3 inch blade of a conventional length rather than the increased length herein. The shape and location of the cut out opening ensures that the material is removed without

The invention claimed is:

1. A sickle cutting apparatus comprising:
a plurality of stationary knife guards arranged to be mounted along a cutter bar;
a sickle bar mounted in transversely extending position and arranged to be driven for reciprocating movement relative to said knife guards;
the sickle bar having a plurality of knife blades mounted thereon for movement therewith;
each of the knife blades having a cutting surface for passing across the knife guards and an opposed surface;
each of the knife blades having on first and second sides first and second side cutting edges converging toward a forward tip of the knife blade;
each knife guard comprising a base portion arranged to be mounted on the cutter bar and at least one guard finger mounted on the base portion so that the guard fingers are arranged to be mounted in a row along the cutter bar;
each guard finger having an upwardly facing ledger surface with opposed side edges thereof arranged to provide first and second shearing edges which cooperate with said side cutting edges of said knife blades;
and a plurality of hold-down members arranged to be mounted along the cutter bar;
each hold-down member comprising a base mounting member arranged to be attached to the cutter bar;
each hold-down member comprising at least one hold-down finger thereon carried on the base mounting member arranged to be at positions spaced longitudinally of the cutter bar so as to be cantilevered forwardly from the cutter bar to a position of a front tip of each hold-down finger located at a spacing in front of the sickle bar above the ledger surface of a respective one of the guard fingers;
the guard fingers and hold down fingers thus forming cooperating overlying pairs between which the knife blades pass in the cutting action;
the guard fingers having no portion elevated above the ledger surface thereof in front of the tip of the blade;
wherein the guard fingers and blades have lengths from the cutter bar arranged such that a forwardmost tip of the guard finger is forward of the tip of the blade;
wherein each knife blade has a front point portion in front of the side cutting edges which front point portion has side edges converging to front apex;
wherein each knife blade comprises a blade body which has between the opposed surface and the cutting surface a constant thickness with each side cutting edge being beveled from the opposed surface to the cutting surface of the knife blade defining a cutting edge at the cutting surface;
wherein the front apex of the front point portion has an apex surface generally at right angles to the cutting surface and the opposed surface;
and wherein the apex surface of the front point portion is not beveled so as to define the thickness of the blade body at the front apex of the front point portion being equal to said constant thickness of the blade body.

2. The sickle cutting apparatus according to claim 1 wherein the beveled side surfaces are serrated in a direction generally at right angles to a center line of the blade body and wherein the beveled and serrated side surfaces terminate at a position spaced from the front apex of the front point portion such that the side surfaces of the front point portion are not serrated.

3. The sickle cutting apparatus according to claim 1 wherein the opposed surface forms a strip along a center line of the blade body where the thickness of the blade body at the strip is equal to the constant thickness and the strip extends into the front point portion substantially to the apex surface.

4. The sickle cutting apparatus according to claim 1 wherein the guard fingers, blades and hold down fingers have lengths from the cutter bar arranged such that a forwardmost tip of the hold down finger is rearward of the tip of the blade.

5. The sickle cutting apparatus according to claim 1 wherein each knife blade is a separate component from each of the other knife blades with two side edges so that the side edges of each knife blade lie immediately adjacent the side edges of the next adjacent knife blades.

6. The sickle cutting apparatus according to claim 1 wherein a width of each guard at a transverse rearmost cutting line at which a cutting action occurs is greater than 1.2 inches.

7. The sickle cutting apparatus according to claim 1 wherein a width of each guard at a transverse rearmost cutting line at which a cutting action occurs is greater than 1.5 inches.

8. The sickle cutting apparatus according to claim 7 wherein the transverse line is defined by a trash bar attached to the guard finger and extending outwardly to the sides thereof.

9. The sickle cutting apparatus according to claim 1 wherein a stroke length of the reciprocating movement is equal to the center line spacing between the knife blades.

10. The sickle cutting apparatus according to claim 1 wherein each of the hold down fingers is adjustable by a screw to change a spacing thereof from the ledger surface of the guard finger.

11. The sickle cutting apparatus according to claim 1 wherein the tip of the guard finger is longer than the tip of the blade by a distance up to 6.0 mm and preferably of the order of 3.0 mm.

12. The sickle cutting apparatus according to claim 1 wherein the tip of the hold down finger is shorter than the tip of the blade by a distance in the range 1.5 to 10.5 mm and preferably of the order of 5.0 mm.

* * * * *